(12) United States Patent
Hagari et al.

(10) Patent No.: US 9,611,798 B2
(45) Date of Patent: Apr. 4, 2017

(54) CONTROL DEVICE OF INTERNAL COMBUSTION ENGINE

(71) Applicant: Mitsubishi Electric Corporation, Chiyoda-ku, Tokyo (JP)

(72) Inventors: Hideki Hagari, Tokyo (JP); Tomokazu Makino, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 138 days.

(21) Appl. No.: 14/333,775

(22) Filed: Jul. 17, 2014

(65) Prior Publication Data

US 2015/0226137 A1   Aug. 13, 2015

(30) Foreign Application Priority Data

Feb. 11, 2014   (JP) .................................. 2014-023903

(51) Int. Cl.
*F02D 41/24* (2006.01)
*F02D 9/02* (2006.01)
(Continued)

(52) U.S. Cl.
CPC ........... *F02D 41/2464* (2013.01); *F02D 9/02* (2013.01); *F02D 11/10* (2013.01);
(Continued)

(58) Field of Classification Search
CPC ................. F02D 41/18; F02D 41/2464; F02D 2200/0404; F02D 41/248; F02D 41/2451; Y02T 10/42
See application file for complete search history.

(56) References Cited

U.S. PATENT DOCUMENTS 4,590,563 A * 5/1986 Matsumura ........... F02D 41/182
                                                            123/406.49
4,814,997 A   3/1989 Matsumura et al.
(Continued)

FOREIGN PATENT DOCUMENTS

| JP | 58-65950 A | 4/1983 |
|---|---|---|
| JP | 2008-57339 A | 3/2008 |
| JP | 5462390 B1 | 1/2014 |

OTHER PUBLICATIONS

Communication dated Mar. 17, 2015 from the Japanese Patent Office in counterpart application No. 2014-023903.

*Primary Examiner* — Sizo Vilakazi
(74) *Attorney, Agent, or Firm* — Sughrue Mion, PLLC; Richard C. Turner

(57) ABSTRACT

In a control device of an internal combustion engine, an atmospheric pressure estimation portion includes an effective opening area calculation portion calculating an effective opening area corresponding to a throttle opening, a throttle opening learning value calculation portion calculating a learning value in a relation of the effective opening area and the throttle opening, an error variation calculation portion calculating an error variation from an error from the corrected learning value, a variation range determination portion determining whether the error variation is within a predetermined range, an atmospheric pressure estimated value update portion updating an atmospheric pressure estimated value, and a target throttle opening calculation portion calculating a target throttle opening using the updated atmospheric pressure estimated value. The throttle opening is controlled to be the target throttle opening. An exact atmospheric pressure can be thus estimated even in the presence of a variation in throttle machine difference.

9 Claims, 16 Drawing Sheets

(51) Int. Cl.
 *F02D 41/00* (2006.01)
 *F02D 41/18* (2006.01)
 *F02D 11/10* (2006.01)
 *F02D 41/02* (2006.01)
 *F02M 35/10* (2006.01)

(52) U.S. Cl.
 CPC ....... *F02D 41/0002* (2013.01); *F02D 41/021* (2013.01); *F02D 41/18* (2013.01); *F02M 35/1038* (2013.01); *F02M 35/10386* (2013.01); *F02D 2009/0225* (2013.01); *F02D 2009/0227* (2013.01); *F02D 2009/0228* (2013.01); *F02D 2009/0255* (2013.01); *F02D 2200/704* (2013.01); *Y02T 10/42* (2013.01)

(56) References Cited

U.S. PATENT DOCUMENTS 7,305,967 B1 * 12/2007 Hagari .................. F02D 9/02
 123/403
2009/0292452 A1 * 11/2009 Nishimura ............. F02D 11/10
 701/106

* cited by examiner

CONTROL DEVICE OF INTERNAL COMBUSTION ENGINE

BACKGROUND OF THE INVENTION

1. Field of the Invention

The present invention relates to a control device of an internal combustion engine having an atmospheric pressure estimation portion applied to a calculation of a control parameter of the internal combustion engine.

2. Background Art

An engine control method called torque-based control is becoming popular recently. According to this method, an output shaft torque of an internal combustion engine (hereinafter, referred to also simply as the engine) is used as a required value of a drive force from a driver or a vehicle side and a generated torque of the engine is controlled using the output shaft torque as an index. Under the torque-based control as above, a target torque of the engine is determined on the basis of an operation amount on an accelerator pedal by the driver. Then, a throttle opening is controlled so that a target intake air flow rate with which the target torque can be generated is sucked into the engine, and an engine output is controlled to be at the target torque by controlling a fuel injection amount and ignition timing according to an actual intake air flow rate. Travelling performance required by the driver is thus achieved.

In order to achieve a target intake air flow rate corresponding to the target torque of the engine as above, an actuator control portion is proposed for an engine control device controlling a throttle opening by driving an actuator continuously provided to the engine throttle. This control portion finds a target opening area of the throttle by calculating a formula of flow rate computation of a restriction flowmeter based on a target intake air flow rate, a pressure ratio before and after the throttle, an opening area of the throttle, and so on. Then, this control portion controls the actuator continuously provided to the throttle so that the throttle has a throttle opening with which the target opening area of the throttle found as above is achieved. However, in order to calculate a throttle opening to achieve the target intake air flow rate by calculating a formula of flow rate computation of a restriction flowmeter, physical quantities before and after the throttle, such as an atmospheric pressure, an internal pressure of an intake pipe (hereinafter, referred to as the intake manifold pressure), and an intake air temperature, are necessary. Accordingly, it becomes necessary to attach sensors detecting these physical quantities. Because the cost is increased by attaching these sensors, there is proposed a method of estimating an atmospheric pressure without using an atmospheric pressure sensor among the necessary sensors.

As a method of estimating an atmospheric pressure without using an atmospheric pressure sensor as above, for example, JP-58-65950 A discloses a method, according to which when throttle openings at a start-up and while the vehicle is moving are equal to or larger than a predetermined value, a value obtained by correcting the intake manifold pressure is used as an atmospheric pressure estimated value. This method, however, has a problem that the throttle opening fails to reach or exceed the predetermined value in some cases depending on an operation state of the driver and the atmospheric pressure estimated value estimated at the start-up is not updated. As a method of solving this problem, there is proposed a method of finding an intake amount from an effective opening area found from the throttle opening and the atmospheric pressure estimated value, and adjusting the atmospheric pressure estimated value so that the intake amount thus found and the target intake amount coincide with each other as is disclosed, for example, in JP 5462390 B. This method can broaden an operation region across which the atmospheric pressure can be estimated in comparison with JP-58-65950 A.

When there is an error in a relation of the throttle opening and the effective opening area due to a variation in throttle machine difference, control can be performed using a throttle opening corrected using a method of having a relation of the throttle opening and the effective opening area be learned as is disclosed, for example, in JP-2008-57339 A.

However, in the case of JP 5462390 B describing the method of finding an intake amount from the effective opening area found from the throttle opening and the atmospheric pressure estimated value and adjusting the atmospheric pressure estimated value so that the intake amount thus found and the target intake amount coincide with each other, when there is an error in the relation of the throttle opening and the effective opening area due to a variation in throttle machine difference, this error is reflected on the atmospheric pressure estimated value and becomes an error from the actual atmospheric pressure. The method disclosed in JP-2008-57339 A to have a relation of the throttle opening and the effective opening area for a variation in throttle machine difference be learned may be applied to the method of adjusting the atmospheric pressure estimated value as above. However, a concrete method of such application is neither described nor suggested. Hence, there is a problem that an exact atmospheric pressure cannot be estimated.

SUMMARY OF THE INVENTION

The invention was devised to solve the problems discussed above and has an object to provide a control device of an internal combustion engine capable of estimating an exact atmospheric pressure even in the presence of a variation in throttle machine difference.

A control device of an internal combustion engine according to an aspect of the invention includes: an operation state detection portion that detects an operation state of an internal combustion engine; a target intake air flow rate calculation portion that calculates a target intake air flow rate on the basis of the operation state of the internal combustion engine; a throttle that is provided to an intake channel of the internal combustion engine; a throttle opening control portion that variably controls an intake amount into the internal combustion engine by varying an effective opening area of the intake channel by controlling a throttle opening of the throttle; a throttle opening detection portion that detects the throttle opening; a pressure detection portion that detects a pressure of the throttle on a side of the internal combustion engine as an intake manifold pressure; an intake air temperature detection portion that detects an intake air temperature of the throttle; an intake air flow rate detection portion that detects an intake air flow rate into the internal combustion engine; and an atmospheric pressure estimation portion that estimates an atmospheric pressure applied to a calculation of a control parameter of the internal combustion engine. The atmospheric pressure estimation portion includes: an effective opening area calculation portion that calculates an effective opening area corresponding to the throttle opening from an estimated atmospheric pressure, the intake air flow rate, the intake manifold pressure, and the intake air temperature; a throttle opening learning value calculation portion that calculates a learning value in a set relation map of effective opening area and throttle opening and a relation of the effective opening area and the throttle opening; a learning value range determination portion that determines whether the relation of the effective opening area and the throttle opening is within a predetermined learning value range; an error variation calculation portion that calculates an error variation from an error between the relation map of effective opening area and throttle opening and a relation map of effective opening area and throttle opening corrected according to the throttle opening learning value calculation portion; a variation range determination portion that determines whether the error variation is within a predetermined range; an atmospheric pressure estimated value update portion that updates the atmospheric pressure estimated value in a case where the relation of the effective opening area and the throttle opening is out of the predetermined range and the error variation is out of the predetermined range; and a target throttle opening calculation portion that calculates a target throttle opening using the atmospheric pressure estimated value updated by the atmospheric pressure estimated value update portion. The control device controls the throttle opening to be the target throttle opening.

According to the control device of an internal combustion engine of the invention, the atmospheric pressure estimated value is updated while learning a relation of a throttle opening and an effective opening area for a variation in throttle machine difference by using a learning range of the throttle opening and a statistical variation in a relation of the throttle opening and the effective opening area as determination criteria. Hence, there can be achieved an excellent advantage that an atmospheric pressure can be estimated with accuracy in a broad operation range while learning a variation in throttle machine difference.

The foregoing and other objects, features, aspects and advantages of the present invention will become more apparent from the following detailed description of the present invention when taken in conjunction with the accompanying drawings.

DETAILED DESCRIPTION OF THE INVENTION

Hereinafter, control devices of an internal combustion engine according to embodiments of the invention will be described with reference to FIG. 1 through FIG. 16.

First Embodiment

Figure 1:
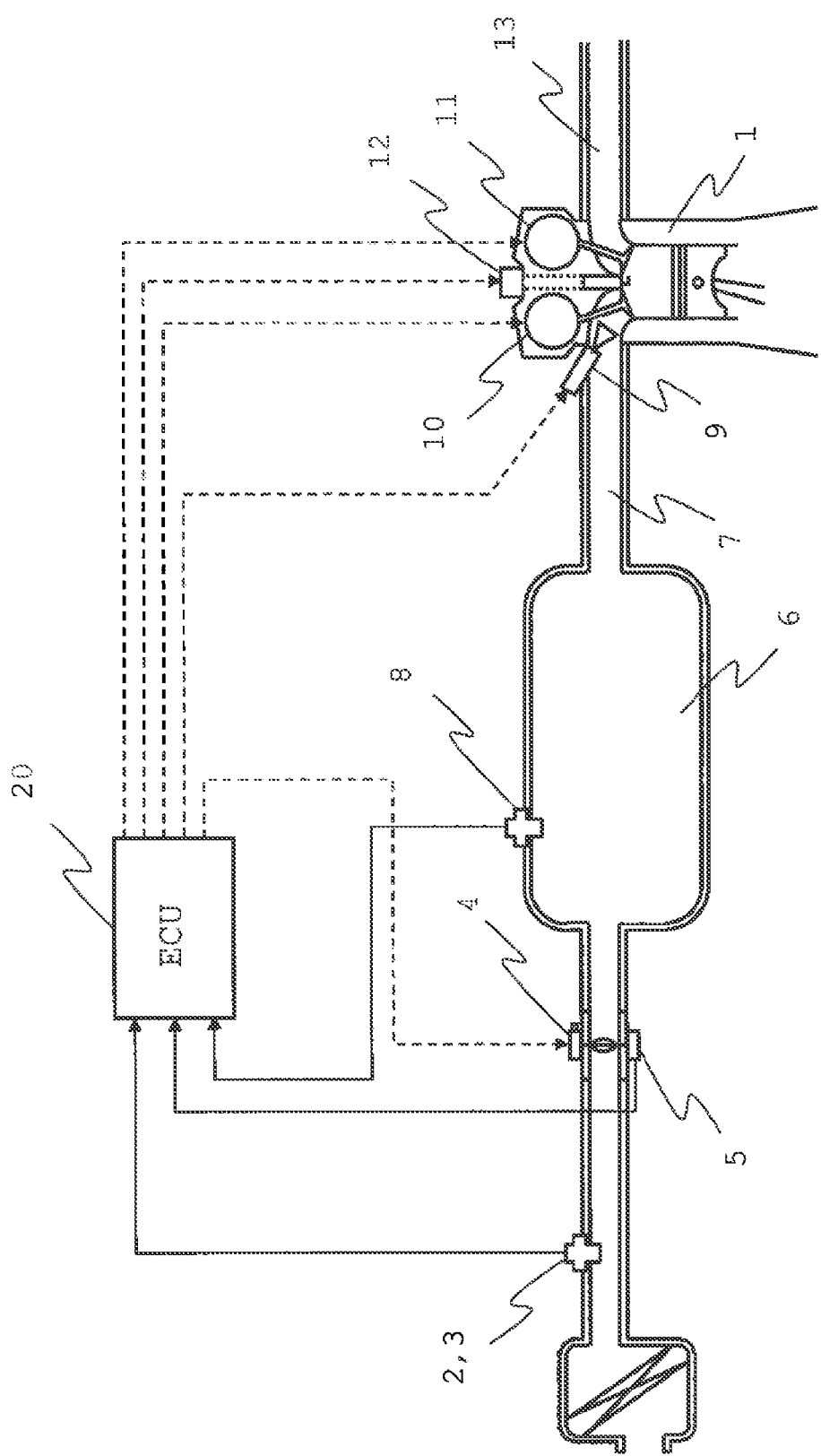
FIG. 1 is a schematic configuration view showing a major portion of a vehicle to which a control device of an internal combustion engine of a first embodiment is applied.
Figure 2:
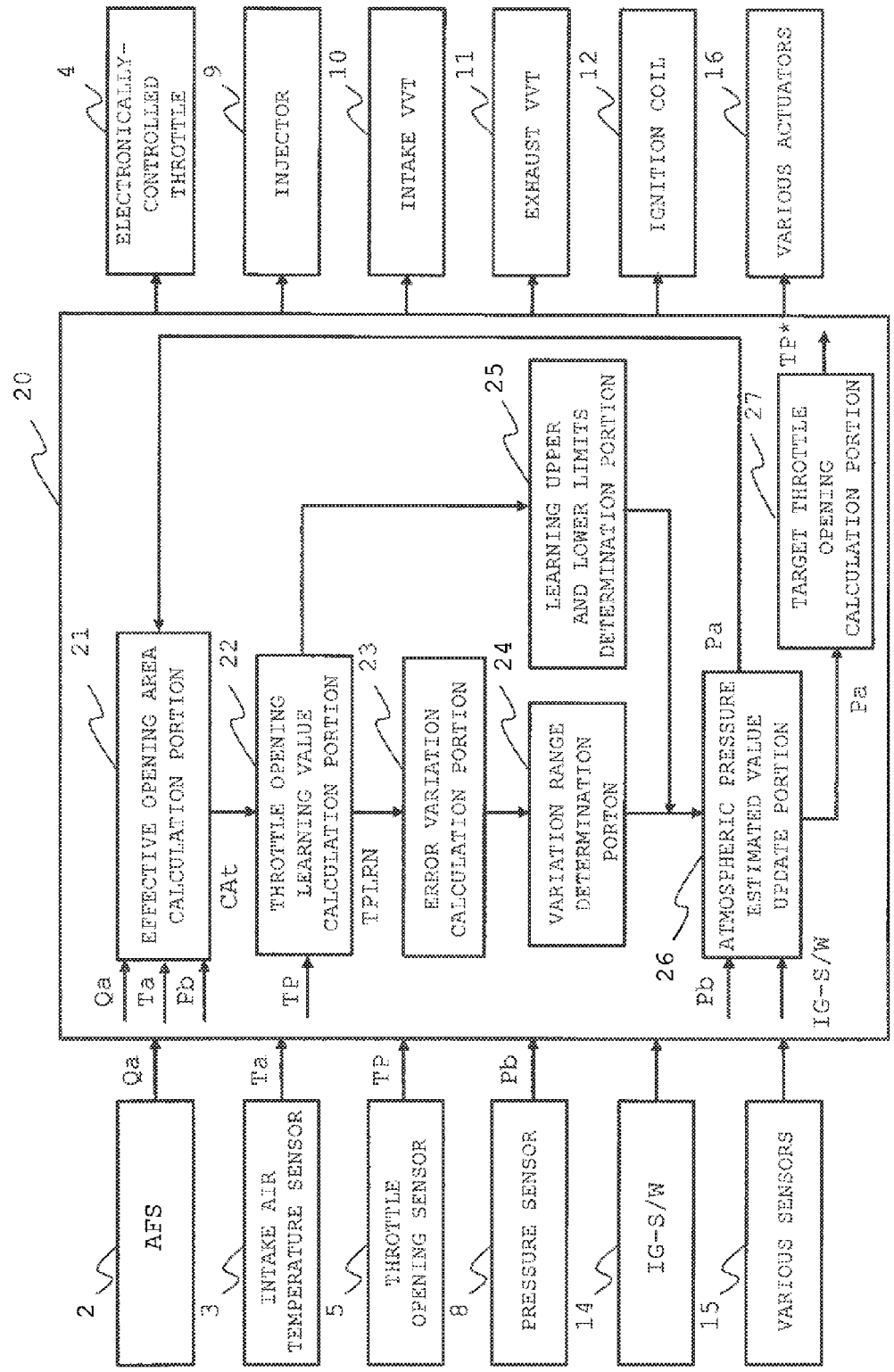
FIG. 2 is a block diagram showing an atmospheric pressure estimation portion in an engine control portion of the first embodiment.
Figure 3:
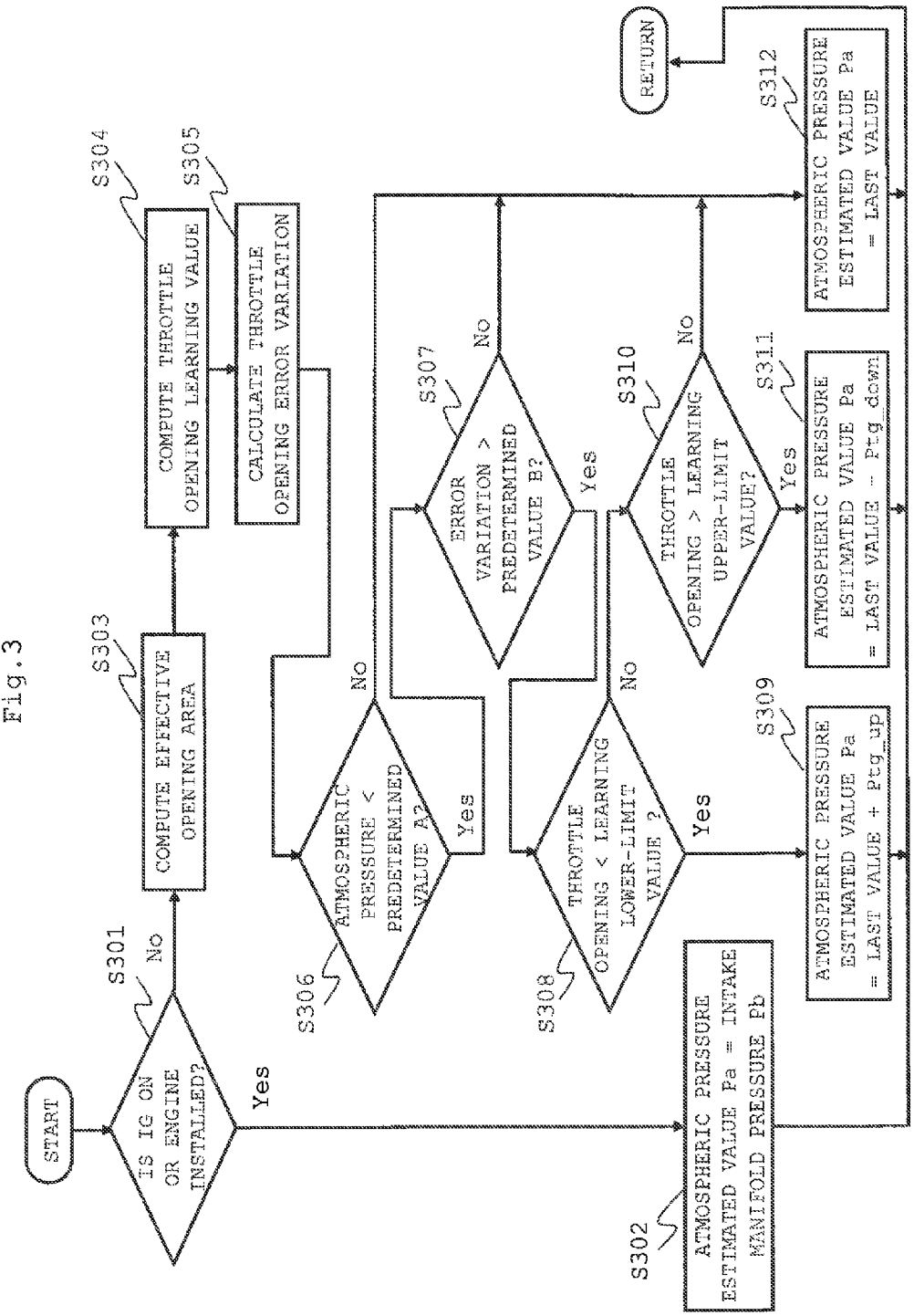
FIG. 3 is a flowchart depicting an atmospheric pressure estimation processing procedure of the first embodiment.

FIG. 1 is schematic configuration view showing a major portion of a vehicle to which a control device of an internal combustion engine of a first embodiment is applied. FIG. 2 is a block diagram showing an atmospheric pressure estimation portion in an engine control portion of the first embodiment. FIG. 3 is a flowchart depicting an atmospheric pressure estimation processing procedure of the first embodiment.

Firstly, a description will be given using FIG. 1 to a configuration of a major portion of a vehicle to which the control device of an internal combustion engine of the first embodiment is applied. An air flow sensor (hereinafter, abbreviated to AFS) 2 measuring an intake air flow rate is provided upstream of an intake system of an engine 1. Further, an intake air temperature sensor 3 is built in the AFS 2 or attached thereto as a separate sensor. An electronically-controlled throttle 4 that is electrically controllable to adjust an intake air flow rate is provided downstream of the AFS 2 on the side of the engine 1.

A throttle opening sensor 5 is provided to measure an opening of the electronically-controlled throttle 4. Further, a pressure sensor 8 is provided to measure an intake manifold pressure in a space (hereinafter, referred to as the intake manifold) including interiors of a surge tank 6 and an intake manifold 7 located downstream of the electronically-controlled throttle 4. A method of estimating an intake air flow rate on the basis of an intake manifold pressure (so-called S/D (Speed/Density) method) may be used instead of the AFS 2, in which case the intake air temperature 3 may be provided inside the intake manifold.

An injector 9 to inject fuel is provided in the vicinity of the intake manifold 7 and an intake valve including an interior of a cylinder. An intake VVT (Variable Valve Timing) 10 and an exhaust VVT 11 to make valve timing variable are provided to the intake valve and an exhaust valve, respectively. An ignition coil 12 to drive a spark plug generating a spark inside the cylinder is provided to a cylinder head. Unillustrated $O_2$ sensor and catalyst are provided to an exhaust manifold 13. There may be a case where only either one of the intake VVT 10 and the exhaust VVT 11 or neither of them is provided.

Information indicating an operation state of the engine 1, including detection signals from the sensors described above and other unillustrated sensors and information on an ignition S/W (hereinafter, abbreviated to IG-S/W), which is an engine start switch (S/W), is inputted into an electronic control unit (hereinafter, abbreviated to ECU) 20 formed of a micro-computer and an interface circuit.

In the ECU 20, a target throttle opening is found by calculating a target torque from various types of data inputted therein, calculating a target intake air flow rate to achieve the calculated target torque, and calculating a target effective opening area to achieve the target intake air flow rate by a method described below. As an atmospheric pressure necessary for a calculation of the target effective opening area, an atmospheric pressure estimated value obtained by performing processing in an atmospheric pressure estimation portion described below is used. The opening of the electronically-controlled throttle 4 is controlled so as to achieve the target throttle opening. In addition, command values to various actuators, including the injector 9, the intake VVT 10, the exhaust VVT 11, and the ignition coil 12, are calculated at the same time.

FIG. 2 shows a configuration of the atmospheric pressure estimation portion in the engine control portion of FIG. 1. Signals from a group of the sensors 2, 3, 5, and 8, the IG-S/W 14, and unillustrated various sensors 15, all of which serve as operation state detection portions, are inputted into the ECU 20. Also, the ECU 20 outputs command values to a group of the actuators 4, 9, 10, 11, and 12 and unillustrated various actuators 16, all of which serve as engine control portions.

All types of processing relating to the engine control are performed inside the ECU 20. Firstly, operations of a throttle control portion and the atmospheric pressure estimation portion of this embodiment will be described briefly.

A throttle effective opening area CAt is found in an effective opening area calculation portion 21 from an intake air flow rate Qa (estimated from an intake manifold pressure Pb in the case of the S/D method), an intake air temperature Ta (used as an alternative to an atmospheric temperature when an intake air temperature sensor is provided inside the manifold), and an intake manifold pressure Pb measured by the AFS 2, the intake air temperature 3, and the pressure sensor 8, respectively, and an atmospheric pressure estimated value Pa described below.

Subsequently, a throttle opening learning value is calculated in a throttle opening learning value calculation portion 22 from the effective opening area CAt calculated earlier, the throttle opening TP measured by the throttle opening sensor 5, and a pre-set relation map of effective opening area and throttle opening. Subsequently, by using the effective opening area CAt, the throttle opening TP, and a relation of an effective opening area CAt' corrected with the throttle opening learning value and the throttle opening TP, a variation amount between the throttle opening TP and a throttle opening TP' after learning correction with respect to the effective opening area CAt or between the effective opening area CAt and an effective opening area CAt' after learning correction with respect to the throttle opening TP is calculated in an error variation calculation portion 23. Whether the calculated variation amount is within a predetermined range is determined by a variation range determination portion 24. Also, whether a relation of the effective opening area CAt and the throttle opening TP is within a predetermined learning value range is determined by a learning upper and lower limits determination portion 25.

Further, when it is determined that the relation of the effective opening area CAt and the throttle opening TP is out of the predetermined learning range and the variation amount is out of the predetermined range, the atmospheric pressure estimated value Pa is updated in an atmospheric pressure estimated value update portion 26. It should be noted that the intake manifold pressure Pb is used as the atmospheric pressure estimated value Pa after the IG-S/W is switched ON and before the engine 1 starts. A target throttle opening TP* is computed in a target throttle opening computation portion 27 using the updated atmospheric pressure estimated value Pa and other information. The electronically-controlled throttle 4 is controlled with the target throttle opening TP* thus computed.

Processing performed in the ECU 20 up to the atmospheric pressure estimated value update portion 26 will now be described in detail with reference to the flowchart shown in FIG. 3 depicting an atmospheric pressure estimation processing procedure performed in computation processing performed at every predetermined timing (for example, main processing performed at every 10 ms or interruption processing performed at every BTDC 75 deg CA).

Initially, in Step S301 of the flowchart, whether the IG-S/W is ON and the engine 1 is stalled is determined. If YES, the flow proceeds to Step S302, in which the atmospheric pressure estimated value Pa is updated by substituting the intake manifold pressure Pb into the atmospheric pressure estimated value Pa, and the processing ends. If NO, it is determined that the engine 1 is operating and the flow proceeds to Step S303.

By updating the atmospheric pressure estimated value Pa when the IG-S/W is ON and the engine 1 is stalled as above, a variance in atmospheric pressure can be addressed even in a case where an atmospheric pressure varies independently of the travelling of the own vehicle (for example, a movement due to shipping).

Subsequently, the throttle effective opening area CAt is computed in Step S303. The calculation method used herein is fundamentally the same as the method described in JP-2008-57339 A. In the following, a basis equation of the fluid dynamics used herein will be described. A formula of volumetric flow rate computation of so-called a restriction flowmeter (in the case of a compressible fluid) is expressed by an equation as follows.

$$Qa = \alpha_a \cdot CA_t \cdot \sqrt{\frac{2}{\kappa-1}\left[\left(\frac{P_b}{P_a}\right)^{\frac{2}{\kappa}} - \left(\frac{P_b}{P_a}\right)^{\frac{\kappa+1}{\kappa}}\right]} \quad \text{Equation 1}$$

where Qa [L/s] is an intake air flow rate, αa [m/s] is an atmospheric acoustic velocity, CAt [cm$^2$] is a throttle effective opening area, Pb [k/Pa] is an intake manifold pressure, Pa [k/Pa] is an atmospheric pressure, and κ[ ] is a specific heat ratio. A dimensionless flow rate σ[ ] is defined by an equation as follows.

$$\sigma = \sqrt{\frac{2}{\kappa-1}\left[\left(\frac{P_b}{P_a}\right)^{\frac{2}{\kappa}} - \left(\frac{P_b}{P_a}\right)^{\frac{\kappa+1}{\kappa}}\right]} \quad \text{Equation 2}$$

Hence, Equation 1 above can be rewritten to Equation 3 as follows.

$$Qa = \alpha_a \cdot CA_t \cdot \sigma \qquad \text{Equation 3}$$

Let R [kJ/(kg·K)] be a gas constant and Ta [K] be an atmospheric temperature, then the atmospheric acoustic velocity αa [m/s] can be expressed by Equation 4 as follows.

$$\alpha_a = \sqrt{\kappa R T_a} \qquad \text{Equation 4}$$

When the intake air flow rate Qa, the atmospheric acoustic velocity αa, and the dimensionless flow rate σ are given, the throttle effective opening area CAt can be calculated in accordance with an equation as below, which is a modification of Equation 3 above.

$$CA_t = \frac{Qa}{\alpha_a \cdot \sigma} \qquad \text{Equation 5}$$

As has been described above, the throttle effective opening area CAt can be found when the intake air flow rate Qa, the atmospheric acoustic velocity αa, and the dimensionless flow rate σ are given.

Figure 4:
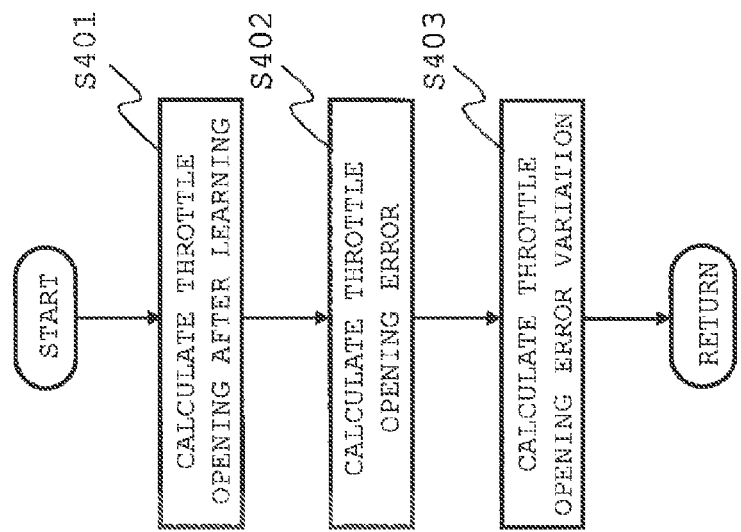
FIG. 4 is a flowchart depicting throttle opening error variation computation processing of the first embodiment.

Subsequently, a throttle opening learning value is computed in Step S304. A computation method of the throttle opening learning value will be described below. Subsequently, an error variation in the throttle opening is computed in Step S305. The error variation in the throttle opening is computed in accordance with a flowchart of FIG. 4 depicting throttle opening error variation computation processing.

Figure 5:
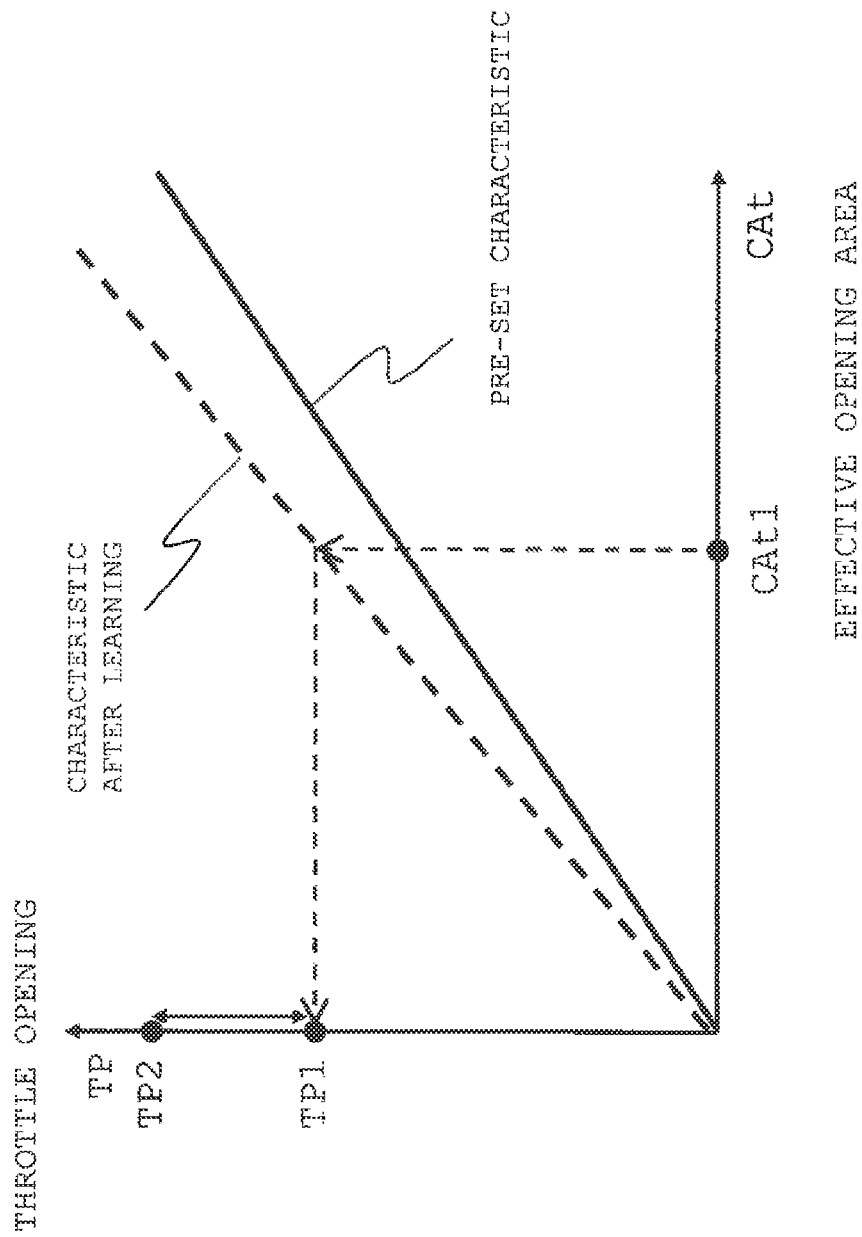
FIG. 5 is a view showing a characteristic after learning in a relation of an effective opening area and a throttle opening of the first embodiment.

The flowchart of FIG. 4 will now be described. Initially in Step S401, a latest throttle opening learning value is calculated from the effective opening area CAt calculated in Step S303, a pre-set relation of effective opening area and throttle opening, and the throttle opening learning value at the last processing timing, and a throttle opening TP1 after learning with respect to the effective opening area CAt is calculated. For example, as is shown in FIG. 5, by using the ordinate for the throttle opening TP and the abscissa for the effective opening area CAt, the pre-set relation of effective opening area and throttle opening is indicated by a solid line. Then, a relation of the effective opening area CAt and the throttle opening TP corrected with the throttle opening learning value is indicated by a broken line. Herein, let CAt1 be the effective opening area calculated in Step S303, then the throttle opening TP1 after learning can be found.

Subsequently, an error of the throttle opening is calculated in Step S402 from the throttle opening TP and the throttle opening TP1 after learning. In Step S403, a dispersion $s^2$ is calculated as an error variation in throttle opening by assuming that an error variation in the throttle opening TP is a normalized distribution. In a case where a sample is formed of N data (x1, x2, . . . , and xn), the dispersion $s^2$ is defined by an equation as follows.

$$s^2 = \frac{1}{N}\sum_{i=1}^{N}(x_i - \bar{x})^2 \quad \left(\because \bar{x} = \frac{1}{N}\sum_{i=1}^{N}x_i\right) \qquad \text{Equation 6}$$

As expressed above, the dispersion $s^2$ is a root mean square of an error between each data (x1, x2, . . . , and xn) and a mean value thereof. In this embodiment, a learning value found from the data in the past is used as the mean value and a value found by subjecting a square of an error between each data and the learning value to averaging processing using a primary filter is assumed to correspond to the dispersion. More specifically, the dispersion is calculated in accordance with Equations 7 and 8 as follows.

$$T_s[n] = (TP2[n] - TP1[n])^2 \qquad \text{Equation 7}$$

$$T_g[n] = K_g \times T_g[n-1] + (1 - K_g) \times T_s[n] \qquad \text{Equation 8}$$

where Ts is a square of an error of the throttle opening, Tg is a dispersion of an error of the throttle opening, TP2 is a throttle opening TP measured by the throttle opening sensor 5, and Kg is a filter coefficient for which a pre-matched value is used. Values other than the primary filter value, for example, a moving average value may be used as well. Herein, n means the latest value and n−1 means the last value.

Hence, by assuming that an error variation in the throttle opening TP is a normalized distribution, the dispersion $s^2$ can be used for the error variation in the throttle opening TP and therefore a variation range can be estimated with ease. The error variation computation of the throttle opening TP ends with the procedure descried as above. Dispersion is used herein. It should be appreciated, however, that a standard deviation, which is a square root of dispersion, may be used instead.

A description will now be given with reference to the flowchart of FIG. 3 again. Whether a pressure ratio is smaller than a predetermined value A is determined in Step S306. The pressure ratio referred to herein is a pressure ratio before and after the throttle, and more specifically, intake manifold pressure Pb/atmospheric pressure estimated value Pa. A value close to 1, for example, 0.95 is set to the predetermined value A. In a case where the pressure ratio is closer to 1 than the predetermined value A, sensitivity of the dimensionless flow rate σ becomes higher and an error of the throttle opening learning value may possibly be increased. The predetermined value A is set as above so as to eliminate such a possibility. If YES, the flow proceeds to Step S307. If NO, the flow proceeds to Step S312. In Step S312, the last atmospheric pressure estimated value Pa is set as the atmospheric pressure estimated value Pa and the processing ends. It may be configured in such a manner that the method in the related art (for example, the method described in JP-58-65950 A) is used in combination in the case of NO before the flow proceeds to Step S312. In other words, it may be configured in such a manner that in a case where the throttle opening TP is larger than the predetermined value or intake manifold pressure Pb>atmospheric pressure estimated value Pa, the flow proceeds to Step S302 and to Step S312 otherwise.

In Step S307, whether the dispersion $s^2$, which is an error variation in the throttle opening TP, calculated in Step S305 is larger than a predetermined value B is determined. If YES, the flow proceeds to Step S308. If NO, the flow proceeds to Step S312. In Step S312, the last atmospheric pressure estimated value Pa is set as the atmospheric pressure estimated value Pa and the processing ends.

Figure 6:
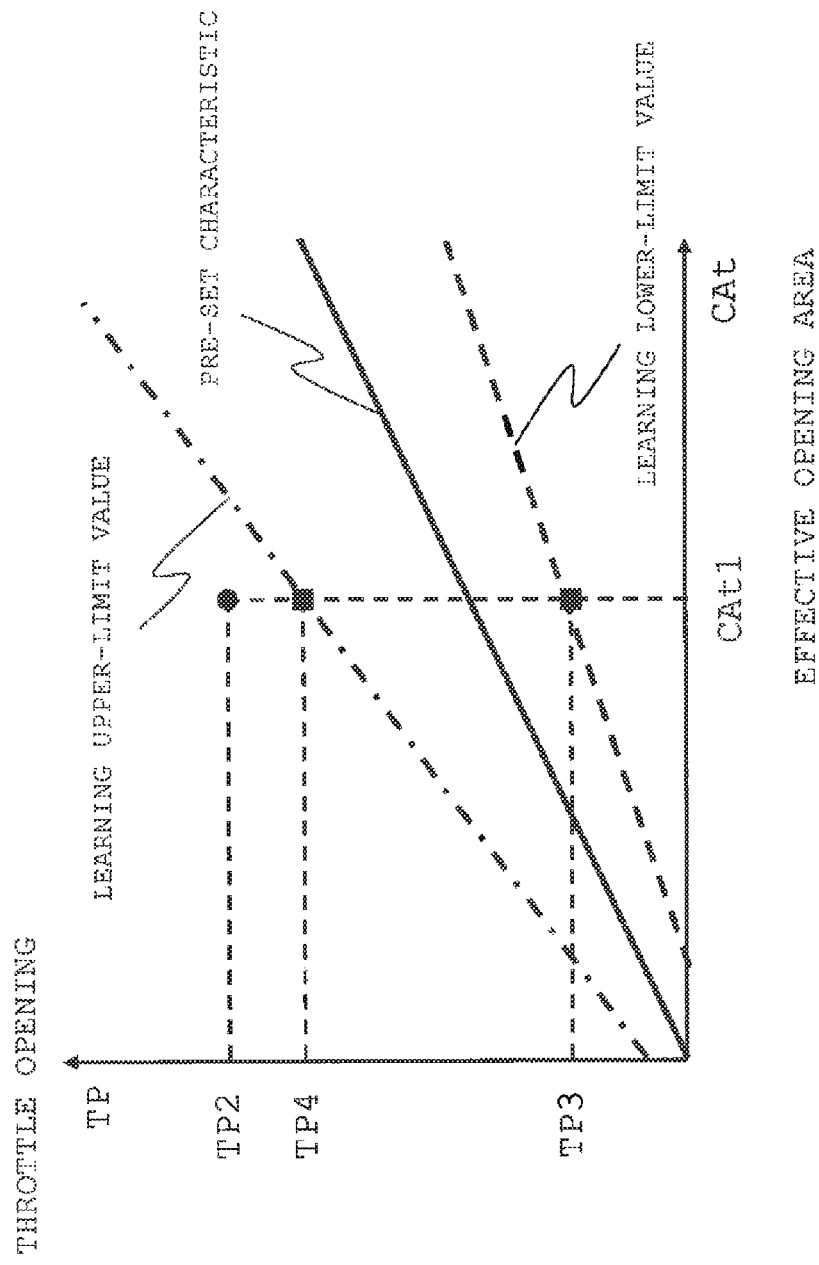
FIG. 6 is a view showing a learning range in the relation of the effective opening area and the throttle opening of the first embodiment.

Subsequently, whether a throttle opening TP2 with respect to the effective opening area CAt1 is smaller than a throttle opening learning lower-limit value is determined in Step S308. If YES, the flow proceeds to Step S309. If NO, the flow proceeds to Step S310. As is shown in FIG. 6, by using the ordinate for the throttle opening TP and the abscissa for the effective opening area CAt, the pre-set relation of effective opening area and throttle opening is indicated by a solid line. Then, the throttle opening learning lower-limit value is indicated by a broken line and a throttle opening learning upper-limit value is indicated by an alternate long and short dash line. The learning upper- and lower-limit values are set in advance by taking a variation in throttle machine difference into consideration. In FIG. 6, when an intersection of the effective opening area CAt1 calculated in Step S303 and the throttle opening TP2 (=TP) obtained from the throttle opening sensor 5 is below a throttle opening learning lower-limit value TP3, the determination result is YES. Because the intersection of FIG. 6 is above the throttle opening learning lower-limit value TP3, the determination result is NO herein.

In Step S309, the latest atmospheric pressure estimated value Pa is obtained by adding a predetermined value Ptg_up to the last atmospheric pressure estimated value Pa and the processing ends. When the intersection is below the throttle opening learning lower-limit value, it is thought that a discrepancy is not attributed to a variation in throttle machine difference and the actual atmospheric pressure is higher than the atmospheric pressure estimated value Pa. Hence, the atmospheric pressure estimated value Pa is updated to an incremental side. It is preferable to set the predetermined value Ptg_up to a value equal to or smaller than 1 [kPa] in order to avoid an abrupt variance of the atmospheric pressure estimated value Pa.

In Step S310, whether the throttle opening TP is larger than a throttle opening learning upper-limit value TP4 is determined. If YES, the flow proceeds to Step S311, in which the latest atmospheric pressure estimated value Pa is obtained by subtracting a predetermined value Ptg_down from the last atmospheric pressure estimated value Pa and the processing ends. The learning upper-limit value is set in advance by taking a variation in throttle machine difference into consideration. When the throttle opening learning value is larger than the learning upper-limit value, it is thought that a discrepancy is not attributed to a variation in throttle machine difference and the actual atmospheric pressure is lower than the atmospheric pressure estimated value Pa. Hence, the atmospheric pressure estimated value Pa is updated to a decremental side. It is preferable to set the predetermined value Ptg_down to a value equal to or smaller than 1 [kPa] in order to avoid an abrupt variance of the atmospheric pressure estimated value Pa. If NO, it means that the atmospheric pressure estimated value Pa is determined as being correct. Hence, the flow proceeds to Step S312, in which the last atmospheric pressure estimated value Pa is set as the atmospheric pressure estimated value Pa and the processing ends.

The atmospheric pressure estimated value Pa is updated by the processing as above.

Figure 7:
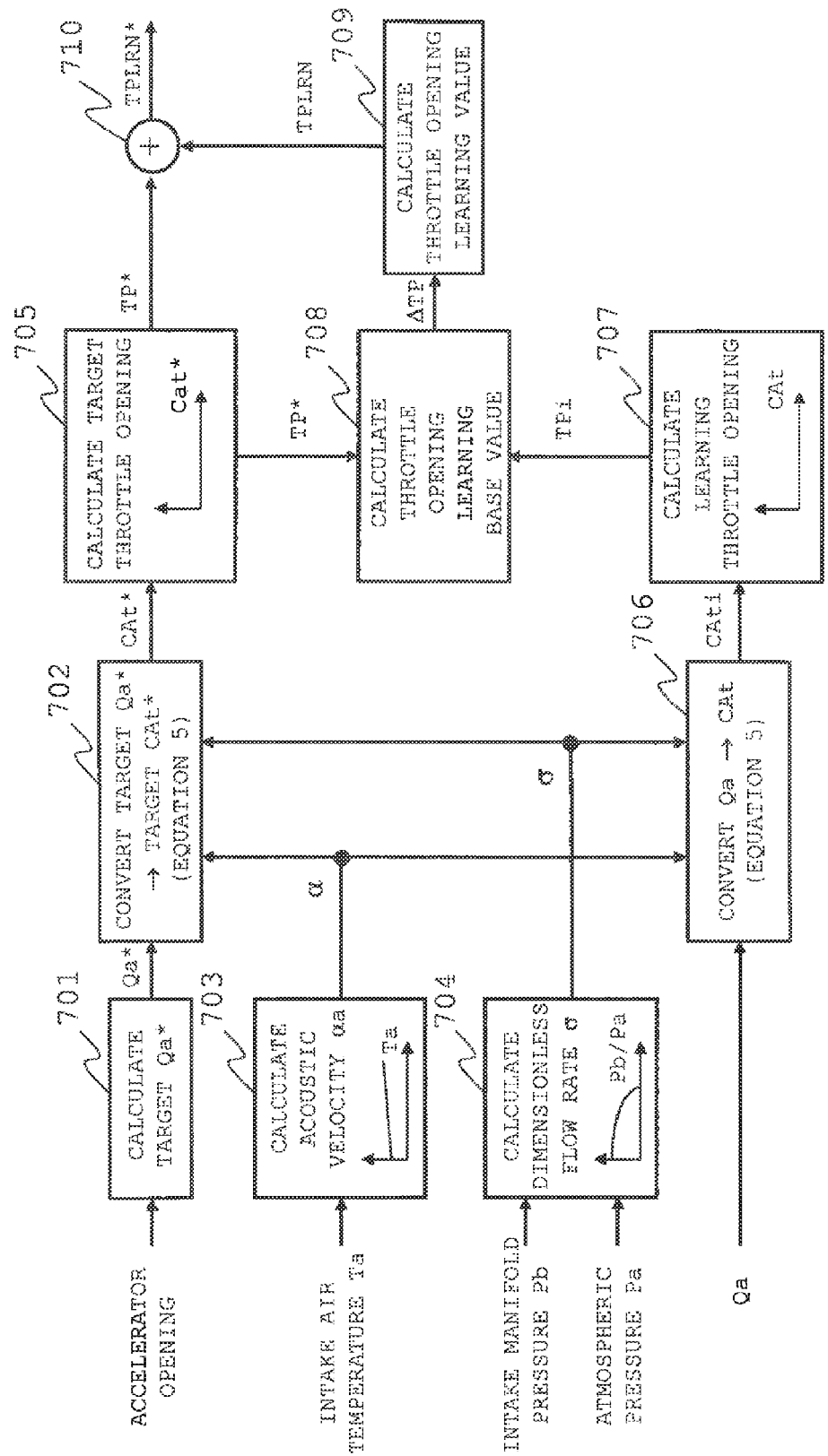
FIG. 7 is a block diagram showing processing by a throttle opening learning value calculation processing portion of the first embodiment.
Figure 8:
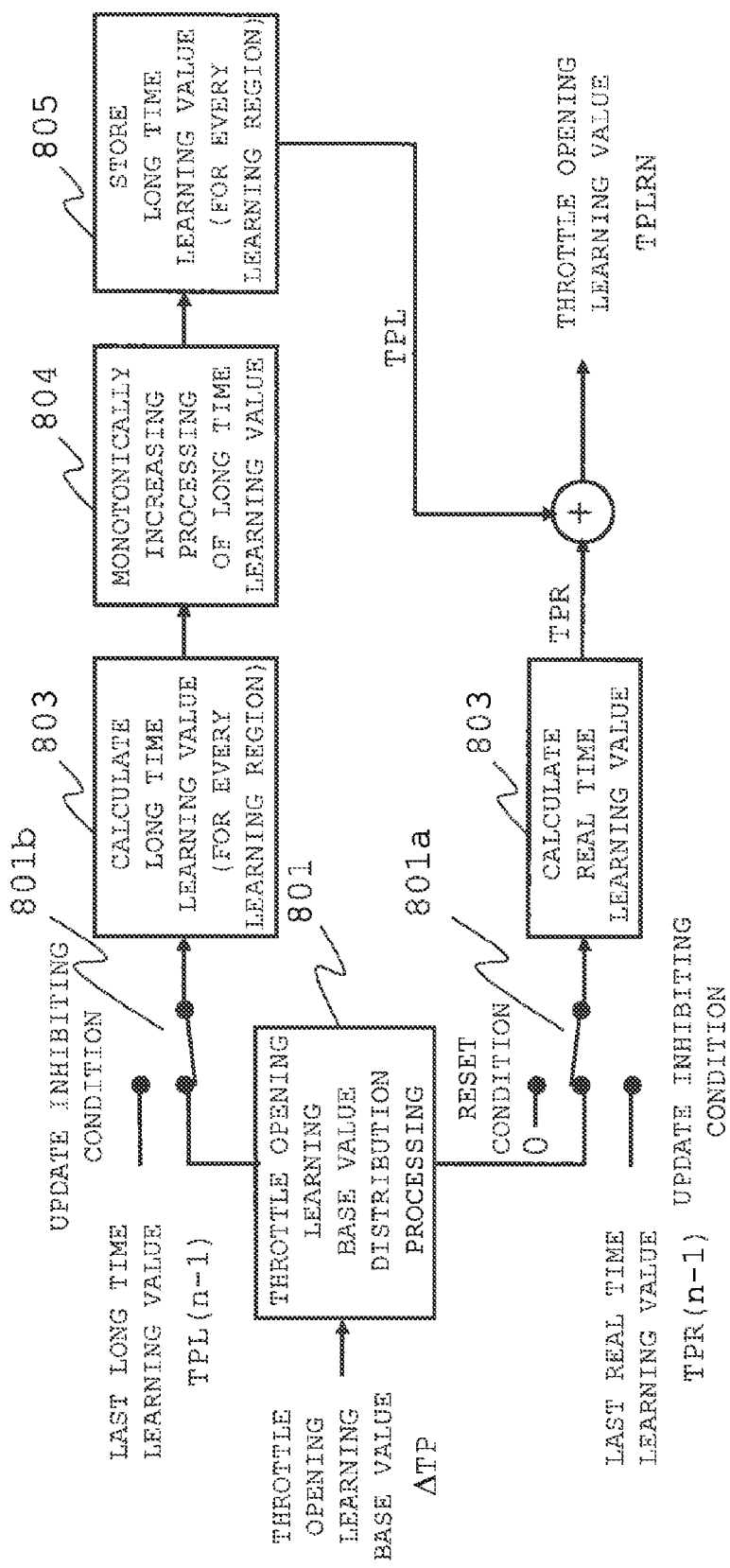
FIG. 8 is a block diagram showing processing by a storage processing portion of a long time learning value of the first embodiment.

A computation of the throttle opening learning value in Step S304 (the throttle opening learning value calculation portion 22) will now be described in detail. This method is fundamentally the same as the method described in JP 5462390 B. Herein, a description will be given to a method of achieving the throttle opening learning value calculation portion 22 using the theoretical formulas expressed by Equations 1 through 5 above. FIG. 7 and FIG. 8 are control block diagrams showing details of the throttle opening learning value calculation portion 22.

Firstly, throttle control and throttle opening learning in the throttle opening learning value calculation portion 22 will be described briefly with reference to the control block diagram of FIG. 7. In a block 701, an engine output index, such as a target torque, is calculated from various types of data, such as an accelerator opening, inputted therein, a target cylinder intake air flow rate necessary to achieve the calculated engine output index is calculated, and a target intake air flow rate (hereinafter, referred to as the target Qa*) passing through the throttle is calculated on the basis of the target cylinder intake air flow rate. Subsequently, the target effective opening area (hereinafter, referred to as the target CAt*) is calculated in a block 702 in accordance with Equation 5 above from the target Qa*, the atmospheric acoustic velocity αa, and the dimensionless flow rate σ as a target CAt* to achieve the target Qa*. In this manner, the target CAt* is calculated in accordance with a formula of flow rate computation of a restriction flowmeter. Hence, even in a case where the environmental condition changes or an engine operation state changes by an introduction of EGR, the target CAt* to achieve the target Qa* can be calculated in a satisfactory manner.

Incidentally, a load of computation increases noticeably when the atmospheric acoustic velocity αa necessary for the computation in the block 702 is computed in the ECU 20 in accordance with Equation 4 above. Hence, as in a block 703, theoretical values for atmospheric acoustic velocities are calculated in advance and stored in the form of a map using the intake air temperature Ta as the axis. The atmospheric acoustic velocity αa is thus calculated using the intake air temperature Ta in the block 703 before the computation in the block 702.

Further, computing the dimensionless flow rate σ necessary for the computation in the block 702 in the ECU 20 in accordance with Equation 2 above is not practical because a load of the computation is extremely large. Hence, as in a block 704, in order to suppress the computation load in the ECU 20, theoretical values for dimensionless flow rates are calculated in advance and stored in the form of a map using a pressure ratio Pb/Pa of the intake manifold pressure Pb and the atmospheric pressure Pa as the axis. Hence, the pressure ration Pb/Pa of the intake manifold pressure Pb and the atmospheric pressure Pa is calculated before the computation in the block 702 and the dimensionless flow rate σ is calculated in the block 704 using the pressure ratio Pb/Pa thus calculated.

It is generally known that a flow rate of air passing through the throttle becomes saturated (so-called choking occurs) when the pressure ratio Pb/Pa is equal to or smaller than a predetermined value E (about 0.528 in case of air). It is also known that the dimensionless flow rate σ calculated in accordance with Equation 2 above takes a constant value when the choking occurs. Hence, in a case where the pressure ratio Pb/Pa of the intake manifold pressure Pb and the atmospheric pressure Pa is equal to or smaller than the predetermined value E, by setting a value in the map in the block 704 to a constant value (about 0.5787 in case of air) corresponding to the predetermined value E, the calculation can be performed even when the choking occurs.

When the pressure ratio Pb/Pa increases to a certain level, influences of vibrations of the intake manifold pressure Pb due to intake air pulsations on the dimensionless flow rate σ become noticeable in some cases. Hence, in a case where the pressure ratio Pb/Pa is equal to or higher than a predetermined value Pr (for example, about 0.95), by handling a value in the map of the block 704 as a constant value (for example, about 0.26) corresponding to a predetermined value Pr, the throttle control performance can be secured by reducing the influences of the intake air pulsations. In a case where a peak value of the intake manifold pressure Pb is larger than the atmospheric pressure Pa, it is thought that air flowing backward through the throttle is generated by a pressure vibration inside the intake manifold. In this case, the value in the map in the block 704 may be handled as a constant value (for example, about 0.26) corresponding to the predetermined value Pr.

As has been described above, the target throttle opening TP* is calculated in a block 705 using the target CAt* calculated in the block 702. In this instance, a relation of the effective opening area CAt calculated in accordance with Equation 5 above and the throttle opening TP is found in advance using the measured intake air flow rate Qa, and the effective opening area CAt and the throttle opening TP are stored in the form of a relation map of the effective opening area CAt and the throttle opening TP in a one-to-one correspondence. Hence, the target throttle opening TP* is calculated from the target effective opening area CAt* using this map.

A description will now be given to a method of calculating a throttle opening learning value TPLRN so as to reduce an error between the target Qa and an actual Qa caused by a variation in a throttle body and various sensors and various estimation errors in a case where the throttle opening TP is controlled with the target throttle opening TP* calculated as described above.

In order to calculate the throttle opening learning value TPLRN, an effective opening area CAti used for learning is calculated in a block 706 from the intake air flow rate Qa, the atmospheric acoustic velocity αa, and the dimensionless flow rate σ. Subsequently, a learning throttle opening TPi is calculated in a block 707 from the effective opening area CAti using the same map used in the block 705. In a block 708, a deviation ΔTP (=TP*−TPi) between the target throttle opening TP* and the learning throttle opening TPi is calculated as a throttle opening learning base value. In a block 709, the throttle opening learning value TPLRN is calculated by integrating ΔTP and then stored. Storing processing of the throttle opening learning value TPLRN in the block 709 will be described in detail below. The target throttle opening TP* and the throttle opening learning value TPLRN calculated as above are added in a block 710 and a target throttle opening TPLRN* after learning correction to drive the electronically-controlled throttle 4 is calculated finally.

As has been described, the throttle opening learning value TPLRN is calculated on the basis of the throttle opening learning base value ΔTP (a deviation between the target throttle opening TP* and the learning throttle opening TPi) in the throttle opening learning value calculation portion 22, so that the throttle opening TP is controlled using the target throttle opening TPLRN* after learning correction obtained by correcting the target throttle opening TP* with the throttle opening learning value TPLRN.

Figure 9:
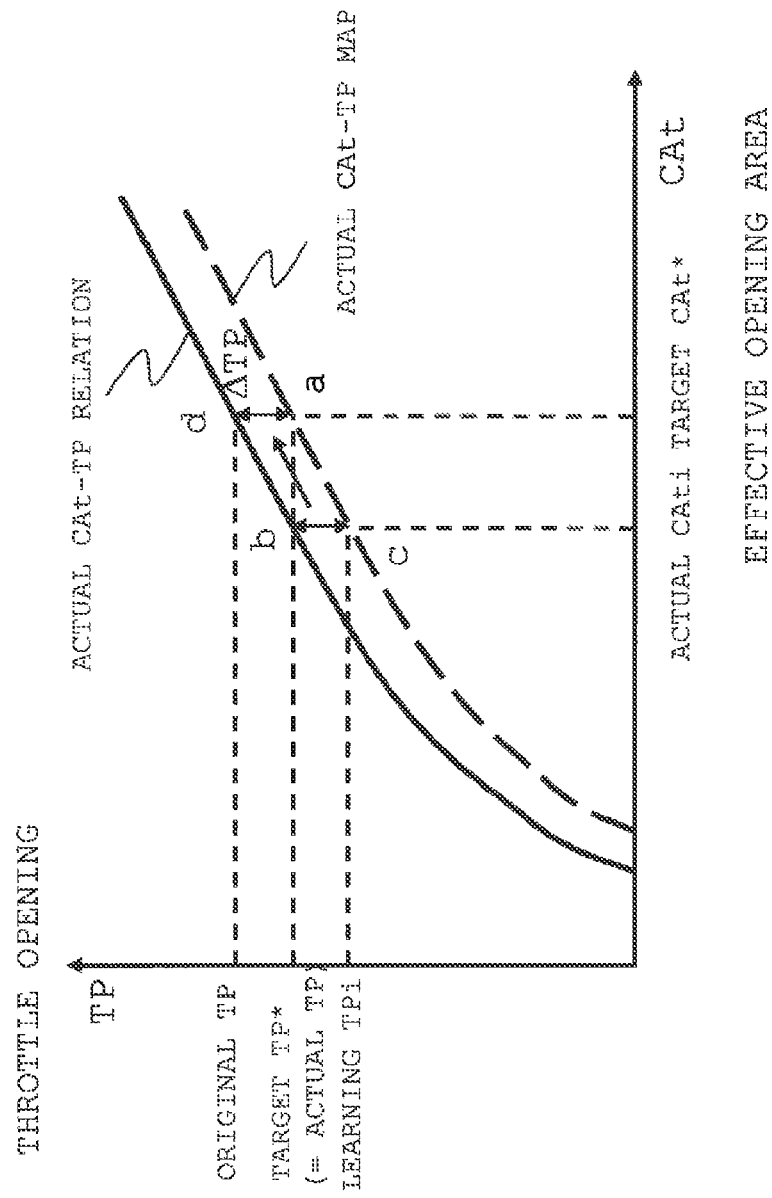
FIG. 9 is a schematic view used to describe a calculation method of a throttle opening learning base value of the first embodiment.

Hereinafter, a learning function of the throttle opening control will be described more specifically with reference also to FIG. 9. FIG. 9 is a view used to briefly describe a calculation method of the throttle opening learning base value ΔTP. Given that the throttle opening TP and the effective opening area CAt are in a one-to-one correspondence. Then, in a case where there is an error between the target intake air flow rate Qa* and the intake air flow rate Qa, it means that there is an error also between the target effective opening area CAt* calculated from the target intake air flow rate Qa* and the effective opening area CAti calculated from the intake air flow rate Qa.

For example, suppose a case as is shown in FIG. 9 where there is an error between a relation map of the effective opening area CAt and the throttle opening TP used to control the throttle opening TP (hereinafter, referred to as the CAt-TP map, which is used in blocks 705 and 707; see the broken line) and a relation of the actual effective opening area CAt computed by estimation by including a variation in the throttle body and variations of the various sensors measuring the intake manifold pressure Pb and the intake air temperature Ta of the engine 1, which is the current controlled subject, and the throttle opening TP (hereinafter, referred to as the actual CAt-TP relation; see the solid line).

Herein, a relation of the target effective opening area CAt* and the target throttle opening TP* is indicated by a point a on the CAt-TP map of FIG. 9. However, when there is an error between the CAt-TP map (broken line) and the actual CAt-TP relation (solid line) as in FIG. 9, the effective opening area CAti at a point b on the actual CAt-TP relation (solid line) corresponding to the target throttle opening TP* differs from the target effective opening area CAt*. Accordingly, the intake air flow rate Qa obtained by controlling the throttle opening TP to be the target throttle opening TP* does not coincide with the target intake air flow rate Qa*.

Hence, in order to calculate a learning value to correct this error, the effective opening area CAti is calculated on the basis of the intake air flow rate Qa measured when the throttle opening TP is controlled to be the target throttle opening TP*. A relation of the effective opening area CAti and the target throttle opening TP* is indicated by the point b on a curve indicating the actual CAt-TP relation (solid line) of FIG. 9.

Referring to FIG. 9, in order to achieve the target effective opening area CAt* (target intake air flow rate Qa*), it is necessary to control the throttle opening TP to be at a point d on the curve indicating the actual CAt-TP relation (solid line). It is therefore necessary to calculate a difference ΔTP between the point a and the point d as a throttle opening learning base value. In this instance, it is assumed as is shown in FIG. 9 that the CAt-TP map (broken line) and the actual CAt-TP relation (solid line) locally have substantially a parallel relation, and a learning throttle opening TPi is calculated using the CAt-TP map (broken line) on the basis of the effective opening area CAti calculated from the intake air flow rate Qa when the throttle opening TP is controlled to be the target throttle opening TP*.

A relation of the calculated learning throttle opening TPi and the effective opening area CAti is indicated by a point c on the CAt-TP map (broken line) of FIG. 9. Hence, it can be deemed that the throttle opening learning base value ΔTP (=TP*−TPi) indicated by a difference between the point b and the point c is substantially equal to a throttle opening learning base value between the point a and the point d. An integration result obtained by multiplying the throttle opening learning base value ΔTP by a gain is found to be the throttle opening learning value TPLRN. By controlling the throttle opening TP to be the target throttle opening TPLRN* after learning correction calculated by adding the throttle opening learning value TPLRN to the target throttle opening TP*, an error between the target intake air flow rate Qa* and the intake air flow rate Qa is reduced.

By configuring as above, when the throttle opening TP to obtain the target intake air flow rate Qa* is calculated, a relation of the effective opening area CAt and the throttle opening TP can be learned and corrected for variations in the throttle body and various sensors and errors of various estimation computations, so that the target intake air flow rate Qa* can be achieved in a satisfactory manner. In this instance, in a case where an error between the CAt-TP map (broken line) and the actual CAt-TP relation (solid line) has nearly a constant (substantially a parallel) relation, control can be performed in a satisfactory manner in the entire operation region even in a case where the throttle opening learning value TPLRN alone is used as feedback control.

Figure 10:
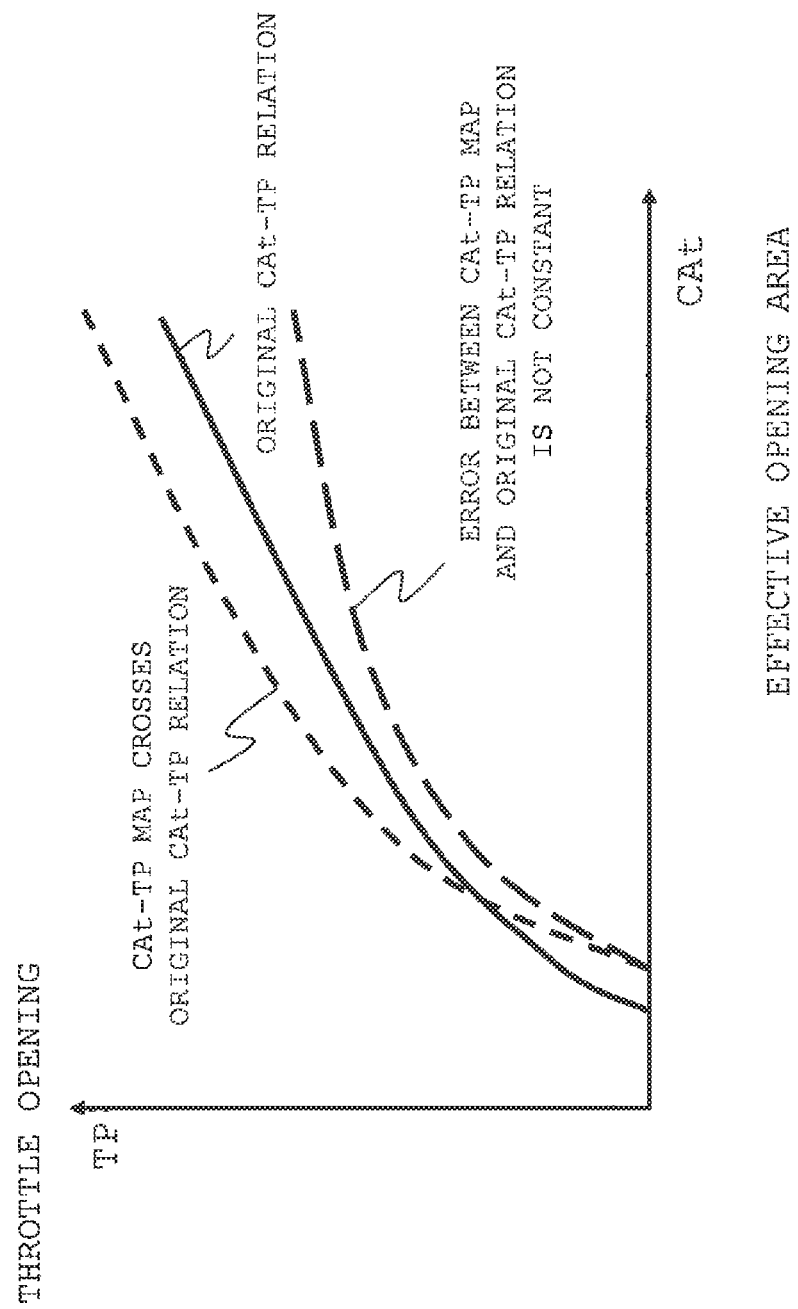
FIG. 10 is a schematic view used to describe a relation the throttle opening may possibly have with respect to the effective opening area of the first embodiment.

In a case as is shown, for example, in FIG. 10 where the CAt-TP map (see the broken line) crosses the actual CAt-TP relation (see the solid line) or an error of the CAt-TP map (see the alternate long and short dash line) is not constant (parallel), using the throttle opening learning value TPLRN alone may possibly raise a problem, such as lagged following and overshooting during a transient operation.

In order to address such a case, it is preferable as shown in FIG. 8 that the throttle opening learning base value ΔTP is distributed to a real time learning value TPR used as the feedback control and a long time learning value TPL stored in every learning region corresponding to a CAt axis of the CAt-TP map (abscissas of FIG. 9 and FIG. 10) and then stored and the throttle opening learning value TPLRN is calculated on the basis of these values. When configured this manner, a sum of a value on the CAt-TP map and the long time learning value TPL can be approximated to the actual CAt-TP relation. Also, by using the real time learning value TPR in combination, an instantaneous error can be absorbed by the feedback control. Hereinafter, the calculation and storing method of the throttle opening learning value will be described in detail with reference to a functional block diagram of FIG. 8 and explanatory views of FIG. 11 and FIG. 12.

Referring to FIG. 8, distribution processing of the throttle opening learning base value ΔTP is performed in a block 801, so that the throttle opening learning base value ΔTP is distributed to the real time learning value TPR and the long time learning value TPL at a predetermined ratio. At a switching portion 801a, when a predetermined reset condition is established, "0" is inputted to a block 802 in which the real time learning value is calculated. When a predetermined update inhibiting condition is established, the last real time learning value TPR(n−1) is inputted. When neither the reset condition nor the update inhibiting condition of the real time learning value TPR is established, the throttle opening learning base value ΔTP after distribution is inputted. Hence, when neither the reset condition nor the update inhibiting condition (described below) of the real time learning value TPR is established, a final real time learning value TPR is calculated in a block 802 on the basis of the throttle opening learning base value ΔTP after distribution.

At a switching portion 801b, when a predetermined update inhibiting condition is established, the last long time learning value TPL(n−1) is inputted to a block 803. When the update inhibiting condition of the long time learning value TPL is not established, the throttle opening learning base value ΔTP after distribution is inputted. Hence, when the update inhibiting condition of the long time learning value TPL is not established, a final long time learning value TPL is calculated for every learning region corresponding to the CAt axis of the CAt-TP map in the block 803 on the basis of the throttle opening learning base value ΔTP after distribution.

As a specific example of the update inhibiting condition at the switching portions 801a and 801b, update of the real time learning value TPR and the long time learning value TPL can be inhibited in a case where the pressure ratio Pb/Pa of the intake manifold pressure Pb and the atmospheric pressure Pa is equal to or larger than a predetermined value F or the peak value of the intake manifold pressure is larger than the atmospheric pressure because an error is produced in the computation of Equation 2 above.

Also, as a specific example of the reset condition at the switching portion 801a, the real time learning value TPR may be reset in a case where a time elapsed since a time variation $dQa^*/dt$ of the target intake air flow rate $Qa^*$ reached or exceeded a predetermined value G indicates a range within a predetermined value H. This condition corresponds to a case where a transient operation is detected. However, by using this condition also as the update inhibiting condition of the long time learning value TPL, an erroneous learning can be suppressed.

In a block 804, the longtime learning value TPL is limited so that the CAt-TP map and the actual CAt-TP relation after a correction by adding the long time learning value TPL monotonically increase. This is also the processing to suppress an erroneous learning and the processing to maintain the relation of the throttle opening TP and the intake air flow rate Qa to be a monotonically increasing relation. In a block 805, the long time learning value TPL via the monotonically increasing processing is stored in every learning region. In a block 806, the throttle opening learning value TPLRN is calculated by adding the real time learning value TPR and the long time learning value TPL.

The long time learning value TPL is stored in a backup memory in the block 805. In other words, when the engine 1 is stopped or the power supply of the ECU 20 is switched OFF, the real time learning value TPR is reset whereas the long time learning value TPL is held in the backup memory.

Figure 11:
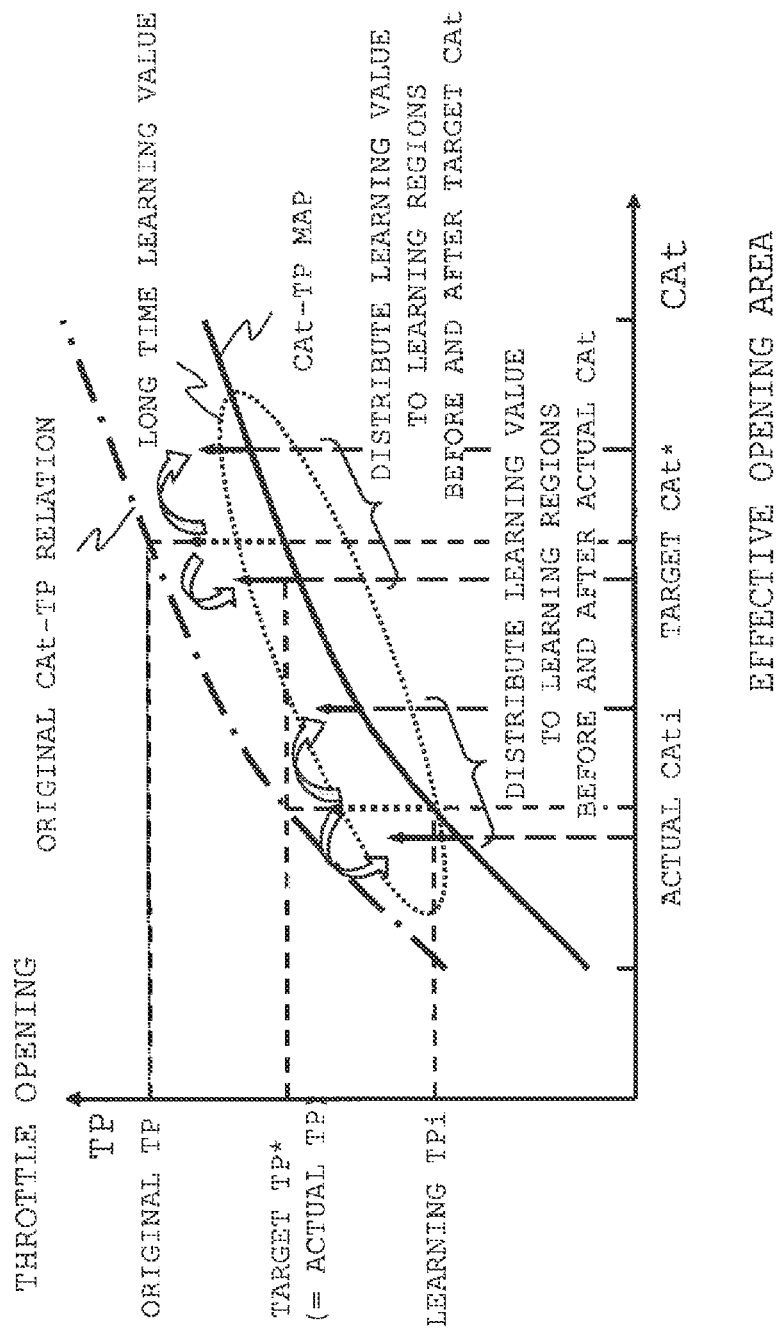
FIG. 11 is a schematic view used to describe a storage processing method of the long time learning value of the first embodiment.
Figure 12:
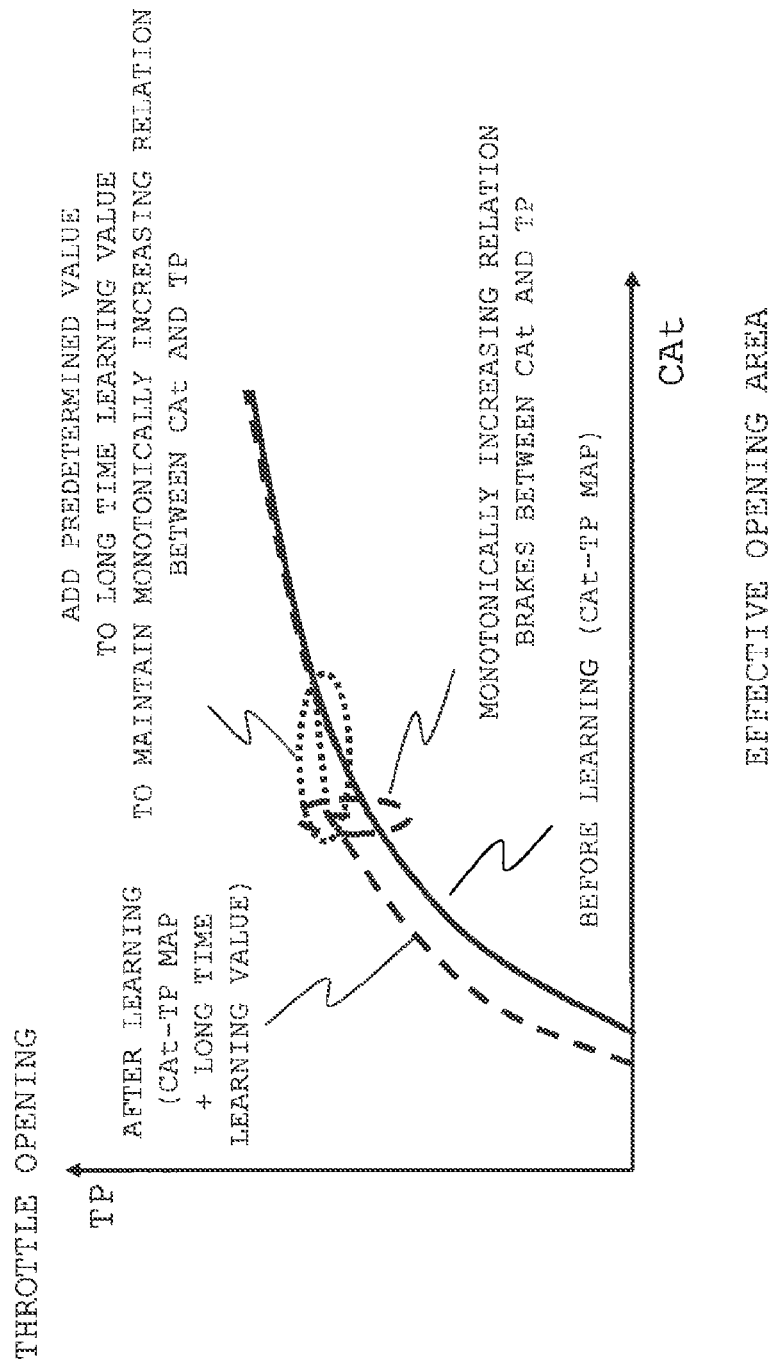
FIG. 12 is a schematic view used to describe a monotonically increasing processing method of the first embodiment.

The calculation processing of the long time learning value TPL for every learning region shown in FIG. 8 will now be described specifically with reference to FIG. 11 and FIG. 12. FIG. 11 and FIG. 12 are views used to briefly describe the storing processing and the monotonically increasing processing of the long time learning value TPL according to the first embodiment of the invention. In FIG. 9, the throttle opening learning base value ΔTP is a difference between the point b and the point c, which can be applied also as a learning value between the point a and the point d. Suppose a case where the throttle opening learning base value ΔTP is distributed to every learning region in a one-to-one correspondence with the CAt axis of the CAt-TP map and then stored. Herein, as is shown in FIG. 11, the throttle opening learning base values ΔTP can be stored as the long time learning value TPL in at least one of a learning region corresponding to the CAt axis before and after the target effective opening area CAt* and a learning region corresponding to the CAt axis before and after the effective opening area CAti.

The long time learning value TPL stored in the learning region corresponding to each CAt axis can be calculated by adding a predetermined value based on the throttle opening learning base value ΔTP to the last long time learning value TPL(n−1), or by calculating a value corresponding to a ratio of the CAt axes before and after the target effective opening area CAt* and the effective opening area CAti from the predetermined value and adding the value thus calculated to the last long time learning value TPL(n−1). By storing the long time learning value TPL for both of the target effective opening area CAt* and the effective opening area CAti, a convergence time of the long time learning value TPL can be shorter.

In a case where the long time learning value TPL is calculated as above, a learning enabled condition is only a case where the update inhibiting condition is not established (described below). Hence, a region in which the learning is actually performed is limited to only a normal region in a steady operation. Also, because the throttle opening TP and the intake air flow rate Qa are generally in a monotonically increasing relation, it is necessary that a relation of the effective opening area CAt and the throttle opening TP is also an monotonically increasing relation.

However, in a case where learning is performed locally, as are indicated by a broken line and a broken line frame of FIG. 12, there can be a case where a sum (see the broken line) of a value of the CAt-TP map (see the solid line) and the long time learning value TPL is not monotonically increasing. In this case, there arises a problem that an output of the engine 1 drops or the throttle opening learning value TPLRN is learned erroneously because, for example, the throttle target opening TPLRN* after learning correction is decreasing while the target intake air flow rate Qa* is increasing.

To overcome this problem, as are indicated by a dotted line and a dotted line frame of FIG. 12, processing to limit the long time learning value TPL for every learning region of the long time learning value TPL is performed in the block 804, so that a sum (see the dotted line) of a value of the CAt-TP map (solid line) and the long time learning value TPL monotonically increases. Accordingly, an erroneous learning of the throttle opening learning value TPLRN and an erroneous operation can be prevented. By configuring as above, the throttle opening learning calculation portion 23 can be achieved to have a relation of the throttle opening TP and the effective opening area CAt be learned.

As has been described, according to the control device of an internal combustion engine of the first embodiment, by computing the throttle opening learning value and updating the atmospheric pressure estimated value while learning a relation of the throttle opening and the effective opening area for a variation in throttle machine difference and by using a statistical variation in deviation between the throttle opening taking the throttle opening learning value into consideration and the throttle opening as determination criteria, there can be achieved an advantage that an atmospheric pressure can be estimated with accuracy regardless of a variation in throttle machine difference.

Second Embodiment

Figure 13:
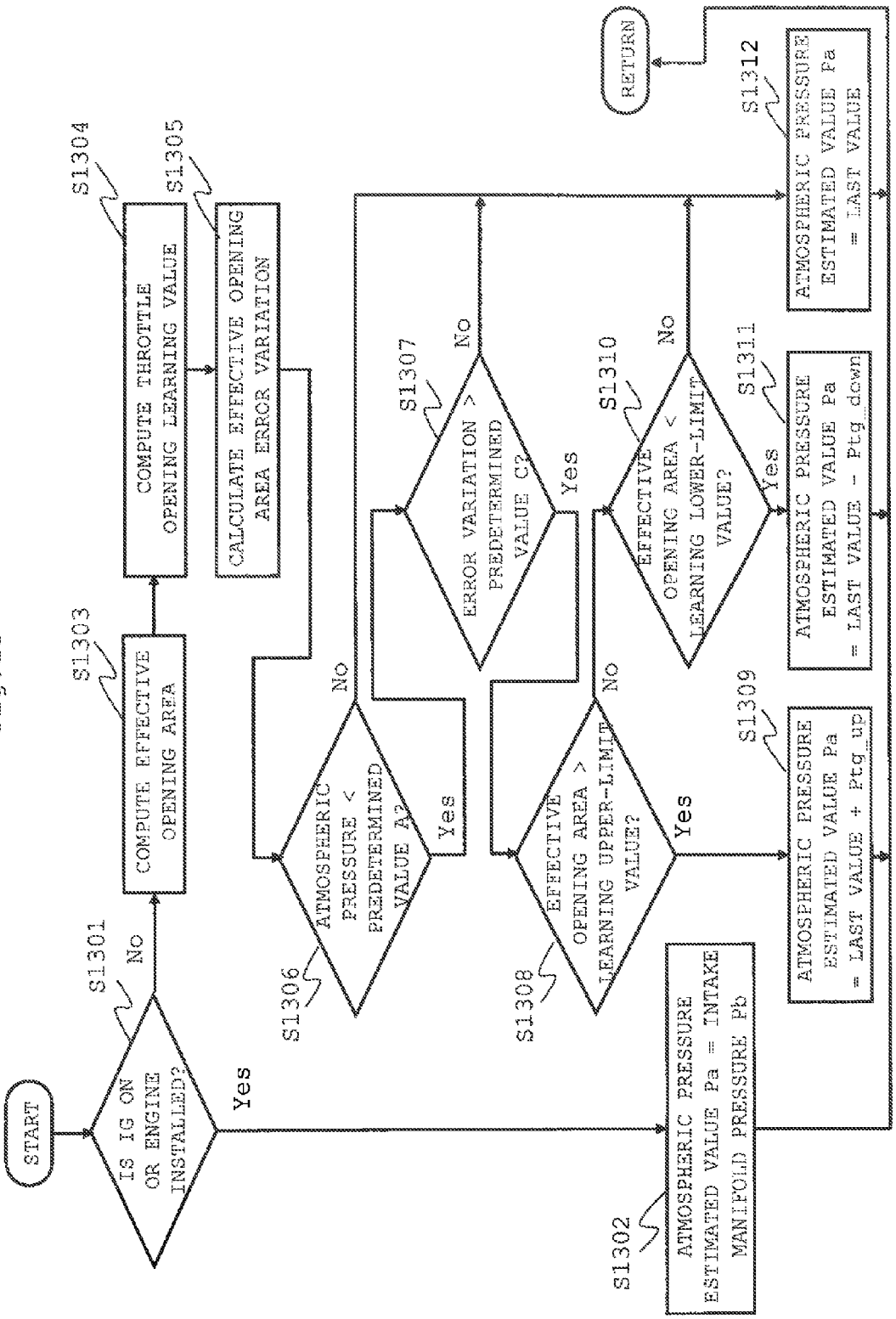
FIG. 13 is a flowchart depicting an atmospheric pressure estimation processing procedure of a second embodiment.
Figure 14:
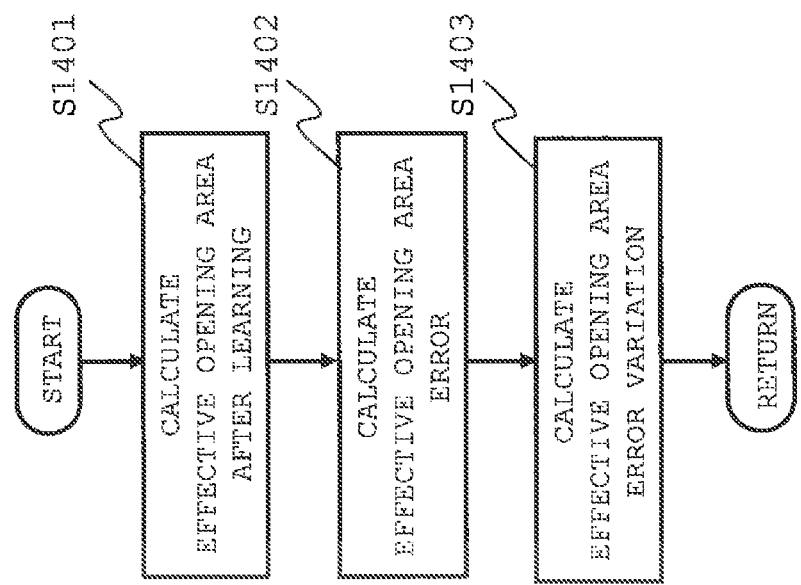
FIG. 14 is a flowchart depicting effective opening area error variation computation processing of the second embodiment.

FIG. 13 is a flowchart depicting an atmospheric pressure estimation processing procedure of a second embodiment. A major portion of a vehicle to which the control device of an internal combustion engine is applied and an atmospheric pressure estimation portion of an engine control portion are the same as the counterparts of the first embodiment above shown in FIG. 1 and FIG. 2, respectively. A difference from the first embodiment above is that in contrast to the first embodiment configured in such a manner that an atmospheric pressure is estimated on the basis of a variation amount between the throttle opening TP and the throttle opening TP' after learning correction with respect to the effective opening area CAt, the second embodiment is configured in such a manner that an atmospheric pressure is estimated on the basis of a variation amount between the effective opening area CAt and the effective opening area CAt' after learning correction with respect to the throttle opening TP.

Processing performed in the ECU 20 up to the atmospheric pressure estimated value update portion 26 will now be described in detail with reference to the flowchart shown in FIG. 13 depicting the atmospheric pressure estimation processing procedure performed in computation processing performed at every predetermined timing (for example, the main processing performed at every 10 ms or interruption processing performed at every BTDC 75 deg CA).

Processing from Step S1301 through Step S1304 of the flowchart of FIG. 13 is the same as the processing from Step S301 through Step S304 of FIG. 3 described in the first embodiment above and a description is omitted herein. Also, the computation of the throttle opening learning value (throttle opening learning value calculation portion 22) in Step S1304 is fundamentally the same as the content described in the first embodiment above and a description is omitted herein.

Figure 15:
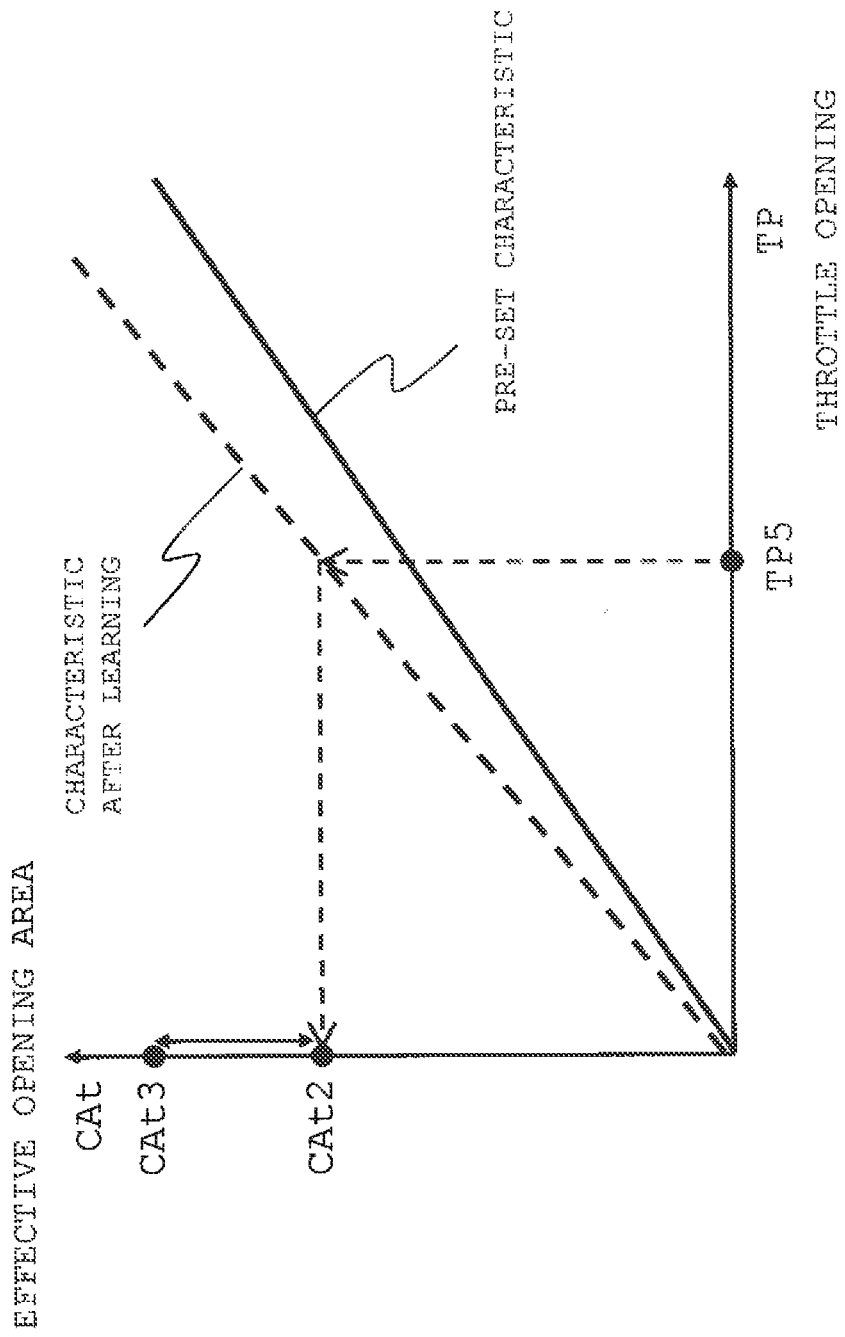
FIG. 15 is a view showing a characteristic after learning in a relation of a throttle opening and an effective opening area of the second embodiment.

A description will be given to Step S1305 and the subsequent steps. In Step S1305, an error variation in the effective opening area CAt is computed. The error variation in the effective opening area CAt is computed in accordance with the flowchart shown in FIG. 14. The flowchart of FIG. 14 will now be described. Firstly in Step S1401, the effective opening area CAt' after learning with respect to the throttle opening TP is calculated by calculating the latest effective opening area learning value from the throttle opening TP found from the throttle opening sensor 5, a pre-set relation of effective opening area and throttle opening, and the effective opening area learning value at the last processing timing. For example, as is shown in FIG. 15, by using the ordinate as the effective opening area and the abscissa as the throttle opening, the pre-set relation of effective opening area and throttle opening is indicted by a solid line. Then, a value corrected with the throttle opening learning value is indicated by a broken line. Herein, let TP5 be the throttle opening TP, then the effective opening area after learning is found to be CAt2. The effective opening area calculated in Step S1303 is given as CAt3.

Subsequently, an error of the effective opening area is calculated in Step S1402 from the effective opening area CAt3 and the effective opening area CAt2 after learning. In Step S1403, dispersion is calculated as an error variation in effective opening area by assuming that an error variation in the effective opening area CAt is a normalized distribution. In the second embodiment, a learning value found from the data in the past is used as a mean value and a value found by subjecting a square of an error between each data and the learning value to averaging processing using a primary filter is assumed to correspond to the dispersion. More specifically, the dispersion is calculated in accordance with Equations 9 and 10 as follows.

$$CAt_s[n]=(CAt3[n]-CAt2[n])^2 \qquad \text{Equation 9}$$

$$CAt_g[n]=K_g \times CAt_g[n-1]+(1-K_g) \times CAt_s[n] \qquad \text{Equation 10}$$

where CAts is a square of an error of the effective opening area, CAtg is a dispersion of the error of the effective opening area, CAt3 is the effective opening area CAt found in Step S1303, and Kg is a filter coefficient for which a pre-matched value is used. A value other than the primary filter value, for example, a movement average value may be used as well. Herein, n means the latest value and n−1 means the last value.

By assuming that an error variation in the effective opening area CAt is a normalized distribution as above, the dispersion can be used as the error variation in the effective opening area CAt and a variation range can be estimated with ease. The error variation computation of the effective opening area CAt ends by the procedure as described above. Dispersion is used herein. It should be appreciated, however, that a standard deviation, which is a square root of dispersion, may be used instead.

A description will be given with reference to the flowchart of FIG. 13 again. In Step S1306, whether a pressure ratio is smaller than a predetermined value A is determined. If YES, the flow proceeds to Step S1307. If NO, the flow proceeds to Step S1312. Herein, the predetermined value A is set in the same manner as in the first embodiment above. In Step S1312, the last pressure estimated value Pa is set as the atmospheric pressure estimated value Pa and the processing ends. It may be configured in such a manner that the method in the related art (for example, the method described in JP-58-65950 A) is used in combination in case of NO before the flow proceeds to Step S1312. More specifically, it may be configured in such a manner that the flow proceeds to Step S1302 when the throttle opening TP is larger than a predetermined value or when intake manifold pressure Pb>atmospheric pressure estimated value Pa, and to Step S1312 otherwise.

In Step S1307, whether the dispersion, which is the error variation in the effective opening area CAt, calculated in Step S1305 is larger than a predetermined value C is determined. If YES, the flow proceeds to Step S1308. If NO, the flow proceeds to Step S1312. In Step S1312, the last atmospheric pressure estimated value Pa is set as the atmospheric pressure estimated value Pa and the processing ends.

Figure 16:
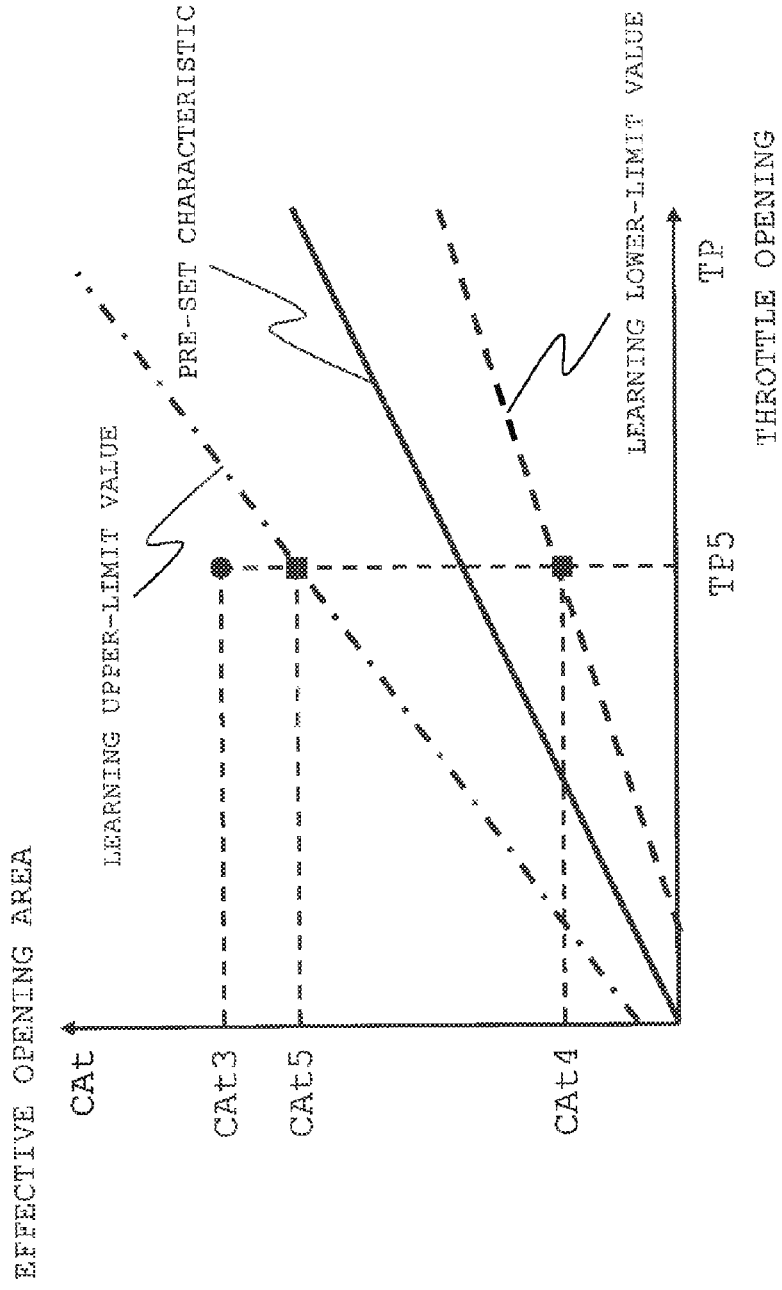
FIG. 16 is a view showing a learning range in a relation of the throttle opening and the effective opening area of the second embodiment.

Subsequently, whether the effective opening area is larger than a throttle opening learning upper-limit value is determined in Step S1308. If YES, the flow proceeds to Step S1309. If NO, the flow proceeds to Step S1310. As is shown in FIG. 16, by using the ordinate for the effective opening area CAt and the abscissa for the throttle opening TP, a pre-set relation of effective opening area and throttle opening is indicated by a solid line. Then, a throttle opening learning lower-limit value is indicated by a broken line and the throttle opening learning upper-limit value is indicated by an alternate long and short dash line. The throttle opening learning upper- and lower-limit values are set in advance by taking a variation in throttle machine difference into consideration. In FIG. 16, when an intersection of the effective opening area CAt3 calculated in Step S1303 and the throttle opening TP5 (=TP) found from the throttle opening sensor 5 is above the throttle opening learning upper-limit value CAt5, the determination result is YES. Because the intersection of FIG. 16 is above the throttle opening learning upper-limit value, the determination result is YES herein.

In Step S1309, the latest atmospheric pressure estimated value Pa is set by adding a predetermined value Ptg_up to the last atmospheric pressure estimated value Pa and the processing ends. When the intersection is above the throttle opening learning upper-limit value, it is thought that a discrepancy is not attributed to a variation in throttle machine difference and an actual atmospheric pressure is higher than the atmospheric pressure estimated value Pa. Hence, the atmospheric pressure estimated value Pa is updated to an incremental side. It is preferable to set the predetermined value Ptg_up to a value equal to or smaller than 1 [kPa] to avoid an abrupt variance of the atmospheric pressure estimated value Pa.

In Step S1310, whether the effective opening area CAt is smaller than a throttle opening learning lower-limit value CAt4 is determined. If YES, the flow proceeds to Step S1311, in which the latest atmospheric pressure estimated value Pa is set by subtracting a predetermined value Ptg_down from the last atmospheric pressure estimated value Pa and the processing ends. When the throttle opening learning value is smaller than the learning lower-limit value, it is thought that a discrepancy is not attributed to a variation in throttle machine difference and an actual atmospheric pressure is lower than the atmospheric pressure estimated value Pa. Hence, the atmospheric pressure estimated value Pa is updated to a decremental side. It is preferable to set the predetermined value Ptg_down to a value equal to or smaller than 1 [kPa] to avoid an abrupt variance of the atmospheric pressure estimated value Pa. If NO, the flow proceeds to Step S1312. In Step S1312, the last atmospheric pressure estimated value Pa is set as the atmospheric pressure estimated value Pa and the processing ends.

The atmospheric pressure estimated value is updated by the processing as described above.

As has been described, according to the control device of an internal combustion engine of the second embodiment, by computing the throttle opening learning value and by updating the atmospheric pressure estimated value while learning a relation of the throttle opening and the effective opening area for a variation in throttle machine difference and by using a statistical variation in deviation between the throttle opening taking the throttle opening learning value into consideration and the throttle opening as determination criteria, there can be achieved an advantage that the atmospheric pressure can be estimated with accuracy regardless of a variation in throttle machine difference.

Note that, the present invention is not limited to the above-mentioned embodiments and the embodiments may be modified or omitted as appropriate without departing from the scope of the present invention. Various modifications and alterations of this invention will be apparent to those skilled in the art without departing from the scope and sprit of this invention, and it should be understood that this is not limited to the illustrative embodiments set forth herein.

What is claimed is:

1. A control device of an internal combustion engine, comprising:
    an operation state detection portion that detects an operation state of an internal combustion engine;
    a target intake air flow rate calculation portion that calculates a target intake air flow rate based on the operation state of the internal combustion engine;
    a throttle that is provided to an intake channel of the internal combustion engine;
    a throttle opening control portion that variably controls an intake amount into the internal combustion engine by varying an effective opening area of the intake channel by controlling a throttle opening of the throttle;
    a throttle opening detection portion that detects the throttle opening;
    a pressure detection portion that detects a pressure of air adjacent to the throttle on a side of the internal combustion engine as an intake manifold pressure;
    an intake air temperature detection portion that detects an intake air temperature of air adjacent to the throttle;
    an intake air flow rate detection portion that detects an intake air flow rate into the internal combustion engine; and
    an atmospheric pressure estimation portion that estimates an atmospheric pressure used in a calculation which calculates a target throttle opening of the internal combustion engine,
    wherein:
    the atmospheric pressure estimation portion includes:
    an effective opening area calculation portion that calculates an effective opening area corresponding to the throttle opening from an estimated atmospheric pressure, the intake air flow rate, the intake manifold pressure, and the intake air temperature,
    a throttle opening learning value calculation portion that calculates a learning value based on a set relation map which maps a stored effective opening area to a stored throttle opening and further based on a relation of the effective opening area and the throttle opening, a learning value range determination portion that determines whether the relation of the effective opening area and the throttle opening is within a predetermined learning value range, an error variation calculation portion that calculates an error variation from an error between the relation map which maps the stored effective opening area and the stored throttle opening and a relation map which maps an effective opening area and a throttle opening and is corrected according to the learning value, a variation range determination portion that determines whether the error variation is within a predetermined range, an atmospheric pressure estimated value update portion that updates a value of the estimated atmospheric pressure in a case where the relation of the effective opening area and the throttle opening is out of the predetermined learning value range and the error variation is out of the predetermined range, and a target throttle opening calculation portion that calculates the target throttle opening using the value of the estimated atmospheric pressure that is updated by the atmospheric pressure estimated value update portion; and the throttle opening is controlled to be the target throttle opening.

2. The control device of an internal combustion engine according to claim 1, wherein:

the error is an error of a throttle opening calculated as a deviation between a throttle opening after learning for the effective opening area calculated from the corrected relation map which maps the effective opening area and the throttle opening and the throttle opening.

3. The control device of an internal combustion engine according to claim 1, wherein:

the error variation is one of a dispersion and a standard deviation of an error of the throttle opening.

4. The control device of an internal combustion engine according to claim 1, wherein:

when the throttle opening with respect to the effective opening area is larger than a predetermined throttle opening learning upper-limit value, the value of the estimated atmospheric pressure is updated to a decremental side and when the throttle opening with respect to the effective opening area is smaller than a predetermined throttle opening learning lower-limit value, the value of the estimated atmospheric pressure is updated to an incremental side.

5. The control device of an internal combustion engine according to claim 1, wherein:

the error is an error of an effective opening area calculated as a deviation between an effective opening area after learning with respect to the effective opening area calculated from the corrected relation map of effective opening area and throttle opening and the effective opening area.

6. The control device of an internal combustion engine according to claim 1, wherein:

the error variation is one of a dispersion and a standard deviation of an error of the effective opening area.

7. The control device of an internal combustion engine according to claim 1, wherein:

when the effective opening area with respect to the throttle opening is larger than a predetermined effective opening area learning upper-limit value, the atmospheric pressure estimated value is updated to an incremental side and when the effective opening area with respect to the throttle opening is smaller than a predetermined effective opening area learning lower-limit value, the atmospheric pressure estimated value is updated to a decremental side.

8. The control device of an internal combustion engine according to claim 1, wherein:

the atmospheric pressure estimation portion sets the intake manifold pressure before starting the internal combustion engine as an initial value of the estimated atmospheric pressure.

9. The control device of an internal combustion engine according to claim 1, further comprising:

a pressure ratio calculation portion that calculates a pressure ratio of the intake manifold pressure and the estimated atmospheric pressure, wherein the atmospheric pressure estimated value update portion stops updating the value of the estimated atmospheric pressure when the pressure ratio calculated by the pressure ratio calculation portion is out of a predetermined range.

* * * * *